(12) United States Patent
Dai et al.

(10) Patent No.: US 12,004,687 B2
(45) Date of Patent: Jun. 11, 2024

(54) AIR FRYER AND COOKING CONTROL METHOD THEREFOR

(71) Applicant: Shenzhen Hesung Innovation Technology Co., Ltd., Shenzhen (CN)

(72) Inventors: Xianglu Dai, Shenzhen (CN); Aimin He, Shenzhen (CN); Lihu Wei, Shenzhen (CN); Xuan Wang, Shenzhen (CN); Lu Chen, Shenzhen (CN)

(73) Assignee: Shenzhen Hesung Innovation Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/519,020

(22) Filed: Nov. 26, 2023

(65) Prior Publication Data
US 2024/0090701 A1    Mar. 21, 2024

Related U.S. Application Data

(63) Continuation-in-part of application No. 17/868,754, filed on Jul. 19, 2022.

(51) Int. Cl.
| | |
|---|---|
| A47J 37/06 | (2006.01) |
| A23L 5/10 | (2016.01) |
| A47J 36/32 | (2006.01) |
| F24C 15/32 | (2006.01) |

(52) U.S. Cl.
CPC ........... *A47J 37/0641* (2013.01); *A23L 5/17* (2016.08); *A47J 36/32* (2013.01); *A47J 37/0664* (2013.01); *F24C 15/327* (2013.01); *A47J 2202/00* (2013.01)

(58) Field of Classification Search
CPC ........... C12Q 1/6883; C12Q 2600/112; C12Q 2600/156
USPC ........................................................ 99/473
See application file for complete search history.

(56) References Cited

U.S. PATENT DOCUMENTS 5,215,000 A * 6/1993 Desage .................. F22B 1/30
99/473
2018/0289212 A1* 10/2018 Sladecek ............. A47J 37/0641

* cited by examiner

*Primary Examiner* — Dana Ross
*Assistant Examiner* — Joseph W Iskra
(74) *Attorney, Agent, or Firm* — David & Raymond Patent Firm; Raymond Y Chan

(57) ABSTRACT

A cooking control method of a cooking apparatus includes steps of heating a cooking chamber of the cooking apparatus to an ambient temperature by a heating unit of the cooking apparatus, detecting the ambient temperature of the cooking chamber, maintaining the ambient temperature of the cooking chamber, maintaining the ambient temperature of the cooking chamber at a predetermined set temperature by controlling the heating unit when the ambient temperature of the cooking chamber reaches the predetermined set temperature, detecting an inner temperature of an inner portion of the cooking object, and controlling the heating unit to heat the cooking chamber to maintain at an appropriate cooking temperature when the inner temperature of the cooking object reaches the appropriate cooking temperature so as to cook the cooking object at the appropriate cooking temperature in the cooking chamber.

6 Claims, 15 Drawing Sheets

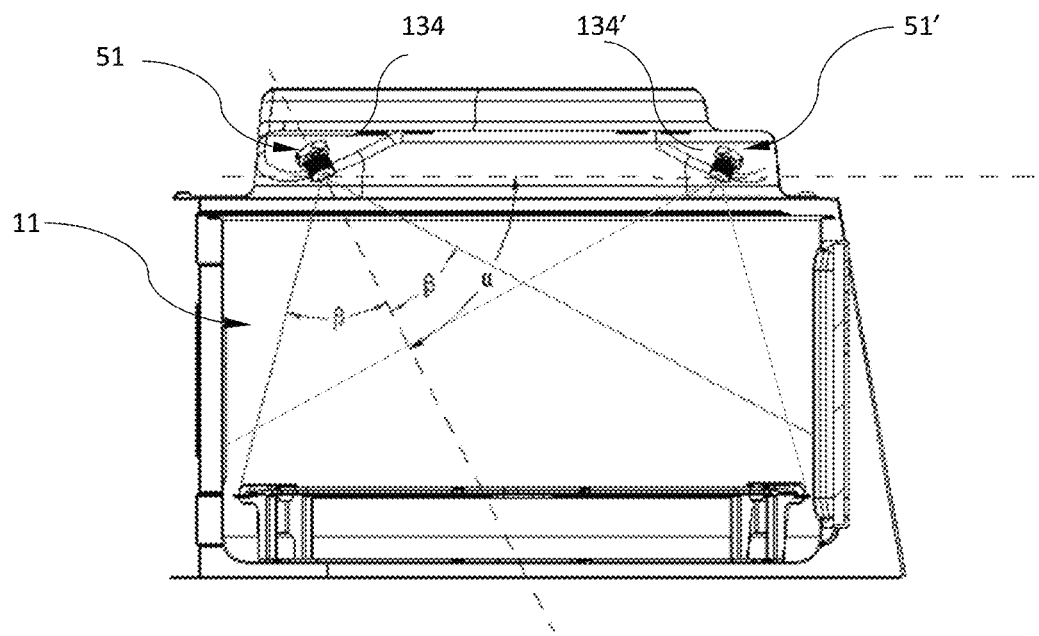
FIG. 26
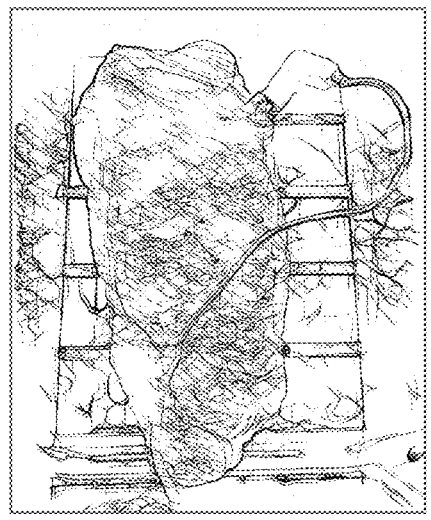 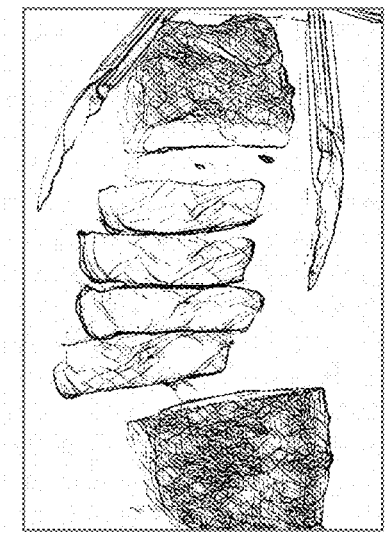
FIG. 27A  FIG. 27B

US 12,004,687 B2

AIR FRYER AND COOKING CONTROL METHOD THEREFOR

CROSS REFERENCE OF RELATED APPLICATION

This application is a Continuation-In-Part application that claims the benefit of priority under 35 U.S.C.§ 120 to a non-provisional application, application Ser. No. 17/868, 754, filed Jul. 19, 2022, which is incorporated herewith by reference in its entirety.

BACKGROUND OF THE PRESENT INVENTION

Field of Invention

The present invention relates to cooking tool, and more particular to a cooking apparatus, such as an air fryer, which is configured to apply water mist evenly on a surface of a cooking object to avoid excessive heating of the surface of the cooking object and an over loss of surface moisture in a surface portion of the cooking object and a cooking control method thereof for controlling the heating of the cooking object according to the temperature condition being monitored during the cooking process.

Description of Related Arts

Air fryer is a cooking machine that utilizes hot air for "frying" operation, wherein hot air is used to replace the hot oil in the original frying pot to heat objects (such as chips, vegetables, meat, fish, and etc.), and to take away the moisture on the surface of the object through hot air to achieve the frying effect. Since the air fryer not only can greatly remove the grease in the object, but also maintain a lot of the demanded qualities of the fried object, such as the appearance of the fried object and etc., the air fryer is getting more and more popular and gaining much attention by the users that results great commercial value.

Currently, the traditional air fryer on the market usually has two operation modes for cooking food. The first operation mode is to directly select a pre-set recipe according to the type of food to be fried. Although this fool-style operation mode can greatly simplify the user's operation and being convenient for the user to use, it is impossible to pre-set all kinds of recipe for all types of food in advance. Practically, only a few common recipes can be predesignated and preset. The second operation mode is that the user manually sets the heating time and temperature according to the taste needs and experience, which certainly can get rid of the limitations of setting recipes, but it greatly relies on the user's experience. For most users, especially who are not the experienced or professional chefs, it is disastrous. In fact, even for culinary chefs, if they are new to using air fryers, they need to do lots of experiments and take many cooking attempts in order to get a considerable air frying effect.

The operation process of the conventional air fryer is usually to heat air by the heat energy generated from the electric heater thereof while the motor fan must be actuated to blow the air inside the air fryer at the same time so as to gradually increase the air temperature inside the air fryer. Then, when the internal air temperature is close to the upper limit of the designated temperature, the operation of the electric heater is stopped. At this time, a portion of the heat inside the air fryer was absorbed by the food, and the other portion of the heat was blown by the motor fan and lost. Thus, the air temperature inside the air fryer drops until the internal air temperature is close to the lower limit of the designated temperature, and then the electric heater is restarted to heat the air again. Therefore, the inner temperature of the air fryer increases and drops repeatedly in order to maintain the inner temperature of the air fryer at a certain level until the preset cooking time is reached. Then, the air fryer stops running to finish cooking the food. However, in the process of cooking, the temperature of the surface of the food and the temperature inside the food are different, so that it is often that the surface of the food has been cooked thoroughly but the inside of the food has not been well cooked, resulting a undercooked defect to the food after cooking, or that in order to ensure the inside of the food being well cooked, the cooking time has to be extended that generally causes serious water loss on the surface of the cooked food after the repeatedly heating to the food surface by the electric heater, leading to severe dehydration of the cooked food causing dry and hard taste that adversely affects the taste of food.

In other words, the air fryer is popular to the users due to its unique cooking method of using hot air to cook food. It has broad market prospects. However, its operation generally needs to rely on the implementation of set recipes to run. In addition, when the user customizes the operation of the air fryer, it is often difficult to reasonably set the heating time and temperature according to the natures and qualities of different kinds of food. Thus, it is difficult to achieve satisfactory cooking results. Also, since the conventional air fryer heats the food with hot air that generally heats the surface of the food firstly, it is a common problem of serve loss of surface moisture of the air-fried food no matter it is cooked based on the operation according to the recipe or the user's custom settings of the heating time and temperature, resulting in dry and hard food that seriously affects the taste of food.

SUMMARY OF THE PRESENT INVENTION

The invention is advantageous in that it provides a cooking apparatus and cooking control method therefor, wherein the heating of the cooking object is conducted under control according to the temperature condition of cooking object by monitoring of the temperature of the cooking object so as to ensure the doneness and taste of the cooked object.

An advantage of the invention is to provide an air fryer and a cooking control method therefor, which can substantially retain the moisture of the cooking food during the cooking process to avoid the cooked food being too dried and hard due to overlossing of water content in the cooked food so as to ensure the cooked food having a tender taste.

An advantage of the invention is to provide an air fryer which is configured to apply a water mist on a surface of the cooking object in the cooking chamber to avoid excessive heating of the surface of the cooking object and an over loss of surface moisture in a surface portion of the cooking object while the cooking object being cooking at the appropriate cooking temperature when the cooking chamber is maintained at the appropriate cooking temperature, greater than or equal to 40° C. and less than or equal to 80° C., when the inner temperature of the cooking object reaches the appropriate cooking temperature.

An advantage of the invention is to provide a cooking control method for an air fryer, which includes a step of spraying a water mist on a surface of the cooking object in the cooking chamber to avoid excessive heating of the surface of the cooking object and an over loss of surface moisture in a surface portion of the cooking object while the cooking object being cooking at the appropriate cooking temperature when the cooking chamber is maintained at the appropriate cooking temperature, greater than or equal to 40° C. and less than or equal to 80° C., when the inner temperature of the cooking object reaches the appropriate cooking temperature.

An advantage of the invention is to provide an air fryer and cooking control method therefor, wherein instead of generating water steam or vapour into the cooking chamber, water mist in room temperature is sprayed on a surface of the cooking object in the cooking chamber, wherein the water mist is not sprayed during the entire cooking process but is sprayed on the surface of the cooking object, that is the supporting surface where the cooking object is placed thereon, when the cooking chamber is maintained at an appropriate cooking temperature, that is greater than or equal to 40° C. and less than or equal to 80° C., upon the inner temperature of the cooking object reaches the appropriate cooking temperature, such that a surface temperature and the inner temperature of the cooking object are maintained at the appropriate cooking temperature for a predetermined set period of time to gradually cook the cooking object until the cooking object is cooked.

An advantage of the invention is to provide an air fryer and cooking control method therefor, wherein the spraying of the water mist is only executed while detecting the inner temperature of the inner portion of the cooking object after the ambient temperature of the cooking chamber of the air fryer is detected and maintained at the predetermined set temperature.

An advantage of the invention is to provide an air fryer and cooking control method therefor, wherein after the spraying of the water mist on the surface of the cooling object, the ambient temperature of the cooking chamber is increased a speed of the air flow to be heated by the heating unit to contact with the surface of the cooking object in the cooking chamber and controlling the heating unit without spraying the water mist to increase the surface temperature of the cooking object until Maillard browning occurs on the surface of the cooking object.

An advantage of the invention is to provide an air fryer and cooking control method therefor, wherein the controlling of the air flow unit in low-speed to drive the air flow in the cooking chamber during the spraying the water mist on the surface of the cooking chamber, and then the controlling of the air flow in high-speed to drive the air flow in the cooking chamber so as to rapidly increase the ambient temperature of the cooling chamber until the Maillard browning occurs.

An advantage of the invention is to provide a cooking apparatus and cooking control method therefor, wherein cooking condition of the cooking object is monitoring by checking and monitoring the inner temperature of the cooking object so as to ensure desired cooking effect that the cooked object can be well cooked to achieve the desired cooked state and the desired taste to meet the expected food doneness and taste.

An advantage of the invention is to provide a cooking apparatus and cooking control method therefor, wherein a predetermined temperature is maintained until the inner temperature of the cooking object reached an appropriate cooking temperature, so as to avoid loss of moisture of the cooking object due to repeated heating and ensure the doneness and taste of the cooked object to meet the desired cooking effect.

An advantage of the present invention is to provide a cooking apparatus and cooking control method therefor, wherein when the inner temperature of the cooking object reaches the appropriate predetermined cooking temperature, reduce the ambient temperature around the cooking object in the cooking apparatus to the appropriate predetermined cooking temperature, so as to ensure the surface temperature and the inner temperature of the cooking object being consistent, and that such consistent temperature condition is maintained until the cooking object is well cooked, thereby not only avoiding the defect of the undercooked of the inner portion of cooking object caused by the inconsistency of the surface temperature and the inner temperature thereof, but also preventing the defect of serve moisture loss of the surface portion of the cooling object caused by the overheating of the surface of the cooking object, in order to ensure the taste of the cooked object while it has been well cooked.

An advantage of the present invention is to provide a cooking apparatus and cooking control method therefor, wherein the moisture of the cooking object is replenished during the process of waiting for the cooking object to be cooked that substantially ensures the desired cooking effect and taste of the cooked object as required by the user through the prevention of moisture loss due to heating.

An advantage of the present invention is to provide a cooking apparatus and cooking control method therefor, wherein once the cooking object is cooked, the ambient temperature of the cooking object is rapidly increased, so as to rapidly rise the surface temperature of the cooking object until Maillard browning occurs, that is a brownish color or deeper crust on the surface of the cooking object is occurred, such that a bright appearance for the cooked object is presented that not only improves the aesthetics of the cooked object but also provides a special taste to meet the user's taste requirements.

An advantage of the present invention is to provide a cooking apparatus and cooking control method therefor, wherein air flow of the cooking environment is enhanced during the process of increasing the ambient temperature of the cooking object, so that the cooking object can be more rapidly heated to improve the heating efficiency of the cooking object.

An advantage of the present invention is to provide a cooking control method and apparatus therefor, wherein the control unit of the cooking apparatus is arranged to control the heating unit to stop further increasing the ambient temperature of the cooking chamber when the ambient temperature of the cooking chamber reaches a predetermined set temperature, such that the cooking object can be heated in the cooking chamber at the set temperature to avoid the cooking object from losing of moisture due to the repeatedly heating that adversely affects the taste of the cooked object. Thus, the cooking effect of the cooked object is ensured while meeting the taste requirements of the user.

An advantage of the present invention is to provide a cooking control method and apparatus therefor, wherein the control unit is arranged to control the heating unit to maintain the ambient temperature of the cooking chamber at an appropriate cooking temperature when the inner temperature of the cooking object reaches the appropriate cooking temperature so as to assure the surface temperature and the inner temperature of the cooking object to be cooked in such state in the cooking chamber are consistent, thereby avoiding a difference of the surface temperature and the inner temperature of the cooking object while cooking in the cooking chamber that often adversely affects the taste of the cooked object and other defects due to the inconsistency of every cooked portions of the cooking object, so as to ensure the preferred cooking effect and taste of the cooked object.

An advantage of the present invention is to provide a cooking control method and apparatus therefor, wherein the cooking apparatus further comprises a humidification unit configured for improving an ambient humidity of the cooking chamber so as to avoid excessive loss of moisture due to heating during the cooking process, thereby avoiding the cooked object taste hard due to excessive loss of water to ensure the desired taste of the cooked object.

An advantage of the present invention is to provide a cooking control method and apparatus therefor, wherein the humidification unit of the cooking apparatus is communicatively linked to and controlled by the control unit, and the work controlled by the control unit, wherein the control unit is arranged in the cooking chamber to control the humidification unit to enhance the ambient humidity of the cooking chamber while the ambient temperature of the cooking chamber is maintained at the appropriate cooking temperature, so as to ensure that the cooking chamber ambient humidity being maintained at a reasonable level during the cooking process of cooking object and thus avoids the cooking object being heated and cooked too dry and hard due to excessive loss of moisture to assure the desired taste of the cooked object.

Another advantage of the present invention is to provide a cooking apparatus and cooking control method therefor, wherein the water mist spraying can be set to execute in an interval manner for predetermined time intervals, for example spraying a predetermined amount of water for a predetermined period of time each time, so as to control the amount of water mist sprayed to moisturize the surface portion of the cooking object, wherein for small moisturization, 1.8 ml/mist spraying to 2.2 ml/mist spraying, or for large moisturization, 2.4 ml/mist spraying to 2.7 ml/mist spraying.

Another advantage of the present invention is to provide a cooking apparatus and cooking control method therefor, which is arranged to spray water mist on one or more surfaces of the cooking object in the cooking chamber, such that the portion of the water mist sprayed in the cooking chamber evaporates to form water vapor to increase a humidity of the cooking chamber, and the portion of the water mist sprayed on one or more surfaces of the cooking object prevents the surface temperature of the cooking object being too high, such as higher than the appropriate cooking temperature; replenishes water to the one or more surfaces of the cooking object to avoid the surfaces of the cooking object from being burnt dry; and reduces the evaporation of moisture content on the surface portion of the cooking object.

According to the present invention, the foregoing and other objects and advantages are attained by a cooking apparatus which comprises:

a body having a cooking chamber therein for accommodating at least one cooking object;

a temperature sensing unit which comprises an ambient temperature sensing module for detecting an ambient temperature of the cooking chamber and an object temperature sensing module for detecting an inner temperature of the cooking object;

a heating unit configured to generate heat for heating the cooking object in the cooking chamber; and a control unit communicating and controlling the temperature sensing unit and the heating unit, wherein the control unit controls the heating of the heating unit according to the ambient temperature of the cooking chamber and the inner temperature of the cooking object so as to ensure a taste of the cooking object to meet the user's taste requirement.

In one embodiment, the cooking apparatus further comprises at least one cooking grill configured to be placed in the cooking chamber, wherein the heating unit is arranged above the cooking chamber while the temperature sensing unit is extended to a ceiling portion of the cooking chamber.

In one embodiment, the heating unit includes a heating element supported above the cooking chamber, an air blower arranged above the heating element for driving an air flow in the cooking chamber so as to spread and disseminate the heat energy in the cooking chamber.

In one embodiment, the cooking apparatus further comprises a heat dissipating device arranged between the heating element and the control unit so as to dissipate heat, generated from the heating unit, around the control unit.

The cooking apparatus further comprises a water mist generating device, which is arranged above the cooking chamber and comprises a water container arranged in an upper portion of the body for containing a predetermined amount of clean water, and one or more mist nozzles communicating with the water container for converting the water from the water container to a water mist and being inclinedly positioned at a ceiling portion of the cooking chamber in such a manner that the water mist is sprayed at a predetermined speed and an adjustable spraying angle to ensure the water mist to be sprayed on one or more surfaces of the cooking object disposed in the cooking chamber.

In one embodiment, the water mist is ejected from the mist nozzle in conical shape, wherein when the spraying angle of the mist nozzle is (3, the installation angle of the mist nozzle is a with respect to a horizontal line and a distance between the cooking grill and the mist nozzle is D, by adjusting the relationship between the spraying angle β, the installation angle α and the distance D, the area on the plane of the water mist can be ensured to be evenly sprayed to the cooking grill, i.e. the surface of the cooking object, to reach more than 80%.

In one embodiment, the control unit is configured to control the temperature the ambient temperature of the cooking chamber such that, when the temperature of the cooking chamber (that is the temperature set by the user) is defined as temperature T1 at a predetermined distance (for example 10 mm) above a center of the cooking grill, the temperature detected by the temperature sensing unit is T2, the temperature T2 of different temperature segments is converted to the temperature T1 by an algorithm of a certain mapping relationship, that is T1=f(T2). For example, 100° C.≤T1≤110° C., T1=T2−B (B is a fixed value), when the user adjusts the set temperature (or the set temperature of the cooking chamber is programmed to be adjusted), the adjusted set temperature T1 is converted to adjust the temperature T2 detected by the temperature sensing unit by adjusting a switching on or off of the heating element of the heating unit, for example.

In one embodiment, the control unit further comprises a mist spraying time controller that is configured to control the spraying of a predetermined amount of water for a predetermined period of time each time, so as to control the amount of water mist sprayed to moisturize the surface portion of the cooking object, for example for small moisturization, 1.8 ml/mist spraying to 2.2 ml/mist spraying, or for large moisturization, 2.4 ml/mist spraying to 2.7 ml/mist spraying.

In one embodiment, the control unit is arranged to control the heating unit to stop further increasing the ambient temperature of the cooking chamber when the ambient temperature of the cooking chamber reaches a predetermined set temperature, such that the cooking object can be heated in the cooking chamber at the set temperature to avoid the cooking object from losing of moisture due to the repeatedly heating that adversely affects the taste of the cooked object. Thus, the cooking effect of the cooked object is ensured while meeting the taste requirements of the user.

In one embodiment, the control unit is arranged to control the heating unit to maintain the ambient temperature of the cooking chamber at an appropriate cooking temperature when the inner temperature of the cooking object reaches the appropriate cooking temperature so as to assure the surface temperature and the inner temperature of the cooking object to be cooked in such state in the cooking chamber are consistent, thereby avoiding a difference of the surface temperature and the inner temperature of the cooking object while cooking in the cooking chamber that often adversely affects the taste of the cooked object and other defects due to the inconsistency of every cooked portions of the cooking object, so as to ensure the preferred cooking effect and taste of the cooked object.

In one embodiment, the cooking apparatus further comprises a humidification unit configured for improving an ambient humidity of the cooking chamber so as to avoid excessive loss of moisture due to heating during the cooking process, thereby avoiding the cooked object taste hard due to excessive loss of water to ensure the desired taste of the cooked object.

In one embodiment, the humidification unit is communicatively linked to and controlled by the control unit, wherein the control unit is arranged in the cooking chamber to control the humidification unit to enhance the ambient humidity of the cooking chamber while the ambient temperature of the cooking chamber is maintained at the appropriate cooking temperature, so as to ensure that the cooking chamber ambient humidity being maintained at a reasonable level during the cooking process of cooking object and thus avoids the cooking object being heated and cooked too dry and hard due to excessive loss of moisture to assure the desired taste of the cooked object.

In one embodiment, the cooking apparatus is provided to have an initial heating state, a constant temperature heating state and a to-be-cooked heating state, wherein the cooking apparatus is arranged to be in the initial heating state after the cooking apparatus is activated to function and sequentially, when the ambient temperature of the cooking chamber reaches a predetermined set temperature detected by the ambient temperature sensing module, the cooking apparatus is arranged to be in the constant heating state, and that when the inner temperature of the cooking object reaches the appropriate cooking temperature, which is lower than the predetermined set temperature, detected by the object temperature sensing module, the cooking apparatus is arranged to be in the to-be-cooked heating state.

In one embodiment, the control unit is provided to control the heating unit to rapidly heat during the initial heating state to increase the ambient temperature of the cooking chamber to reach the predetermined set temperature.

In one embodiment, the control unit is arranged to control the heating unit during the constant temperature heating state to maintain the ambient temperature of the cooking chamber at the predetermined set temperature.

In one embodiment, the control unit is arranged to control the heating unit during the to-be-cooked heating state to maintain the ambient temperature of the cooking chamber at the appropriate cooking temperature.

In one embodiment of, the appropriate cooking temperature is determined according to the type of object to be cooked.

In one embodiment of, the appropriate cooking temperature is ranged greater than or equal to 40° C. and less than or equal to 80° C.

In one embodiment, the humidification unit is linked and communicated to the control unit, wherein the control unit is arranged to control the humidification unit to enhance the ambient humidity of the cooking chamber during the to-be-cooked heating state.

In one embodiment, the object temperature sensing module comprises a probe body, a thermistor provided at a front end of the probe body and a transmission element electrically connecting the thermistor to the control unit, wherein the probe body is configured to capable of inserting into the cooking object to place the thermistor inside the cooking object, such that a resistance value of the thermistor varies with the inner temperature of the cooking object and the inner temperature of the cooking object is transmitted to the control unit through the transmission element.

In one embodiment, the cooking apparatus is further arranged to have a coloring heating state, wherein when the ambient temperature of the cooking chamber during the to-be-cooked heating state reaches a predetermined set period of time, the cooking apparatus enters the coloring heating state that the control unit controls the heating unit to rapidly heat and increase the ambient temperature of the cooking chamber, wherein the predetermined set period of time is determined according to the type of cooking object.

In one embodiment, the cooking apparatus comprises an air flow unit, linked and communicated to the control unit, wherein the control unit is arranged to control the air flow unit to drive air flow in the cooking chamber.

In one embodiment, the control unit is arranged to control the heating unit by controlling an electrical power supply switch of the heating unit.

In one embodiment, the control unit is arranged to control the heating unit by adjusting an electric current and/or voltage of the heating unit.

In one embodiment, the humidification unit is configured to increase the ambient humidity of the cooking chamber in a continuous manner.

In one embodiment, the humidification unit is configured to increase the ambient humidity of the cooking chamber in an intermittent manner.

In one embodiment, the control unit is arranged to control the air flow unit at a low speed to drive the air flow in the cooking chamber during the initial heating state, the constant temperature heating state and the to-be-cooked heating state.

In one embodiment, the control unit is arranged to control the air flow unit at high speed to drive the flow of air in the cooking chamber during the coloring heating state.

In accordance with another aspect of the invention, the foregoing and other objects and advantages are attained by a cooking control method, comprising steps of:

(A) heating a cooking chamber of a cooking apparatus to an ambient temperature by a heating unit of the cooking apparatus;

(B) detecting the ambient temperature of the cooking chamber of the cooking apparatus;

(C) maintaining the ambient temperature of the cooking chamber at a predetermined set temperature by controlling the heating unit in response to a condition that the ambient temperature of the cooking chamber reaches the predetermined set temperature;

(D) detecting an inner temperature of the cooking object until an inner temperature reaches an appropriate cooking temperature; and (E) controlling the heating unit to heat the cooking chamber to maintain at the appropriate cooking temperature when the inner temperature of the cooking object reaches the appropriate cooking temperature, so as to cook the cooking object at the appropriate cooking temperature in the cooking chamber.

In one embodiment, the step (E) further comprises a step of:

(E.1) controlling an ambient humidity of the cooking chamber by means of the humidification unit of the cooking apparatus.

In one embodiment, the step (D) further comprises steps of:

(D.1) detecting inner temperature of an inner portion of the cooking object by a thermistor provided at a front end of a probe body of the object temperature sensing module of the cooking apparatus by inserting the probe body into the inner portion of the cooking object; and (D.2) obtaining the inner temperature of the inner portion of the cooking object through the detection of a resistance value of the thermistor which varies with the inner temperature of the cooking object.

In one embodiment, the appropriate cooking temperature is determined according to the type of cooking object being cooked.

In one embodiment, the appropriate cooking temperature is ranged greater than or equal to 40° C. and less than or equal to 80° C.

In one embodiment, the cooking control method controls the heating unit by controlling a power supply switch of the heating unit.

In one embodiment, the cooking control method controls the heating unit by adjusting the current and/or the voltage of the heating unit.

In one embodiment, in the step (E.1), the ambient humidity of the cooking chamber is increased continuously by the humidification unit.

In one embodiment, in the step (E.1), the ambient humidity of the cooking chamber is increased intermittently by the humidification unit.

In one embodiment, the cooking control method further comprises steps of:

(F) controlling the heating unit to increase the ambient temperature of the cooking chamber when the cooking object is well cooked.

In one embodiment, in the step (A), the step (C), the step (E), and the step (F), an air flow unit is provided in cooking apparatus for controlling a driving of a flow of air in the cooking chamber.

In one embodiment, in the step (A), the step (C), and the step (E), the air flow unit is controlled at a low speed to drive the air flow in the cooking chamber.

In one embodiment, in the step (F), the air flow unit is controlled at a high speed to drive the air flow in the cooking chamber.

In accordance with another aspect of the present invention, the foregoing and other objects and advantages are attained by a method of controlling an ambient humidity of a cooking chamber of an air fryer for cooking at least a cooking object in the cooking chamber, comprising steps of:

(i) detecting an inner temperature of an inner portion of the cooking object after an ambient temperature of the cooking chamber of the air fryer is detected and maintained at a predetermined set temperature by controlling a heating unit in response to a condition that the ambient temperature of the cooking chamber reaches the predetermined set temperature, wherein the heating unit generates thermal energy, which is transmitted to an air flow in the cooking chamber, and is controlled by a control unit to maintain the ambient temperature of the cooking chamber at the predetermined set temperature;

(ii) maintaining the cooking chamber at an appropriate cooking temperature, greater than or equal to 40° C. and less than or equal to 80° C., by controlling the heating unit to heat the air flow of the cooking chamber when the inner temperature of the cooking object reaches the appropriate cooking temperature, and spraying a water mist on one or more surfaces of the cooking object in the cooking chamber containing the cooking object such that the air flow heated by the heating unit mainly evaporate a moisture in the cooking chamber instead of a surface moisture of a surface portion of the cooking object to reduce a loss of the surface moisture in the surface portion of the cooking object while the cooking object being cooking at the appropriate cooking temperature such that a surface temperature and the inner temperature of the cooking object are maintained at the appropriate cooking temperature for a predetermined set period of time to gradually cook the cooking object until the cooking object is cooked; and (iii) increasing a speed of the air flow to be heated by the heating unit to contact with the surface of the cooking object in the cooking chamber without spraying the water mist to increase the surface temperature of the cooking object until Maillard browning occurs on the surface of the cooking object.

In one embodiment, in the step (ii), the ambient humidity of the cooking chamber containing the cooking object is increased by the water mist generating device which is controlled by the control unit, wherein the water mist generating device is configured to spray the water mist in the cooking chamber containing the cooking object to increase the ambient humidity of the cooking chamber to provide a continuous supplement of the ambient humidity in the cooking chamber, and to spray the water mist on the surface of the cooking object to provide a continuous supplement of water moisture of a surface portion of the cooking object.

In one embodiment, the method further comprises a step of circulating an air flow in the cooking chamber by an air flow unit which is configured and operated to drive the air flow in the cooking chamber, such that the thermal energy generated by the heating unit is transmitted in the cooking chamber to heat the air flow in the cooking chamber.

In one embodiment, during the step (i) and the step (ii), the air flow unit is controlled in low-speed to drive the air flow in the cooking chamber, wherein, during the step (iii), the air flow unit is controlled in high speed to drive the air flow in the cooking chamber to rapidly increase the ambient temperature of the cooking chamber.

In one embodiment, in the step (i), the inner temperature of the inner portion of the cooking object is detected by an object temperature sensing module through inserting a thermistor provided at a front end of a probe body of the object temperature sensing module into the inner portion of the cooking object, and the ambient temperature of the cooking chamber is detected by an ambient temperature sensing module installed in a body of the air fryer, wherein the object temperature sensing module and the ambient temperature sensing module are electrically connected with the control unit.

In one embodiment, the inner temperature of the inner portion of the cooking object is obtained through a detection of a resistance value of the thermistor value of the thermistor.

In one embodiment, the ambient temperature of the cooking chamber is maintained at the predetermined set temperature by controlling a power supply of the heating unit, such that when the ambient temperature of the cooking chamber rises and reaches the predetermined set temperature, a power supply loop of the heating unit is switched off to stop a running and operation of the heating unit, and when the ambient temperature of the cooking chamber drops to lower than the predetermined set temperature, the power supply loop of the heating unit is switched on to supply the thermal energy to the cooking chamber and the ambient temperature of the cooking chamber rises back to the predetermined set temperature, so that the ambient temperature of the cooking chamber is maintained at the predetermined set temperature by mean of a cycling of switching on and off of the power supply loop of the heating unit.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 26 is a partial sectional view illustrating the cooking chamber of the cooking apparatus according to an alternative mode of the above preferred embodiment of the present invention.

FIG. 27A is a schematic view of a cooking object cooked by the cooking apparatus and control method thereof according to the preferred embodiment of the present invention.

FIG. 27B is a schematic view of cut pieces of the cooking object cooked by the cooking apparatus and control method thereof according to the preferred embodiment of the present invention.

Figure 1:
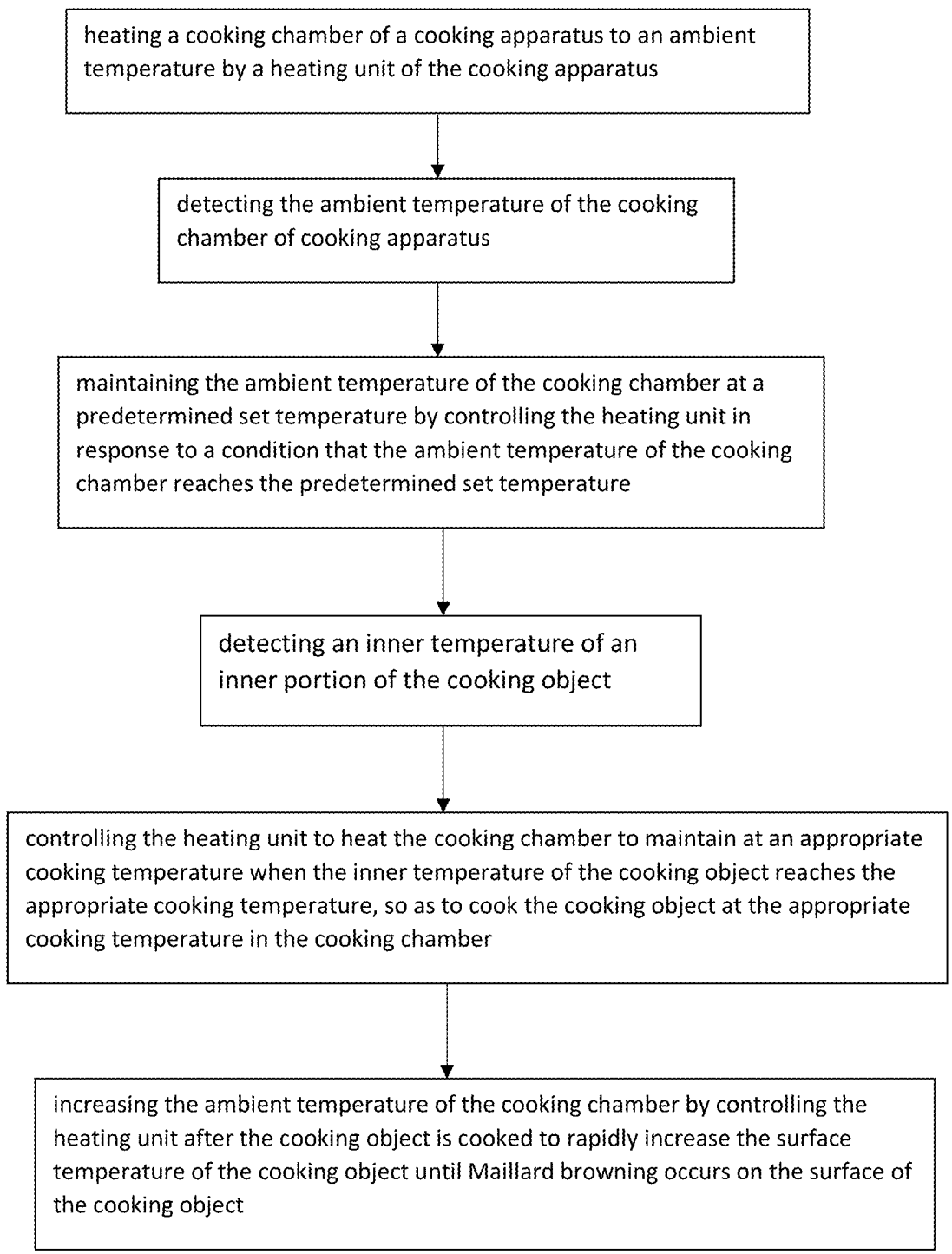
FIG. 1 is a flow block diagram illustrating a cooking control method according to a preferred embodiment of the present invention.

The drawings, described above, are provided for purposes of illustration, and not of limitation, of the aspects and features of various examples of embodiments of the invention described herein. The drawings are not intended to limit the scope of the claimed invention in any aspect. For simplicity and clarity of illustration, elements shown in the drawings have not necessarily been drawn to scale and the dimensions of some of the elements may be exaggerated relative to other elements for clarity.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIG. 1 of the drawings, a cooking control method according to a preferred embodiment is illustrated, wherein the cooking control method comprises steps of:

(A) heating a cooking chamber 11 of a cooking apparatus 100 to an ambient temperature by a heating unit 20 of the cooking apparatus 100;

(B) detecting the ambient temperature of the cooking chamber 11 of cooking apparatus 100;

(C) maintaining the ambient temperature of the cooking chamber 11 at a predetermined set temperature T1 by controlling the heating unit 20 in response to a condition that the ambient temperature of the cooking chamber 11 reaches the predetermined set temperature T1;

(D) detecting an inner temperature of an inner portion of the cooking object; and (E) controlling the heating unit 20 to heat the cooking chamber 11 to maintain at an appropriate cooking temperature T2 when the inner temperature of the cooking object reaches the appropriate cooking temperature T2, so as to cook the cooking object at the appropriate cooking temperature T2 in the cooking chamber 11.

In particular, the cooking control method can monitor the temperature of the cooking object to be cooked in a way such as frying, wherein the temperature of the cooking chamber 11 is maintained at the appropriate cooking temperature T2 after the inner temperature of the cooking object reaches the appropriate cooking temperature, such that the cooking object can be cooked in an environment at a temperature of the appropriate cooking temperature T2 so as to ensure the surface temperature and the inner temperature of the cooking object to be maintained at a consistent temperature (i.e. the appropriate cooking temperature) to avoid an over loss of surface moisture of the cooking object due to a difference between the inner temperature and the surface temperature and affect the taste of the cooked object in order to ensure the cooking effect. It is worth mentioning that the cooking control method is suitable for cooking operations of various cooking apparatus such as ovens, air fryers and etc. Also, the cooking object adapted to be cooked by the cooking control method of the present invention can be food object such as potato fries or chips, vegetable, meats, fish, and etc.

Figure 4:
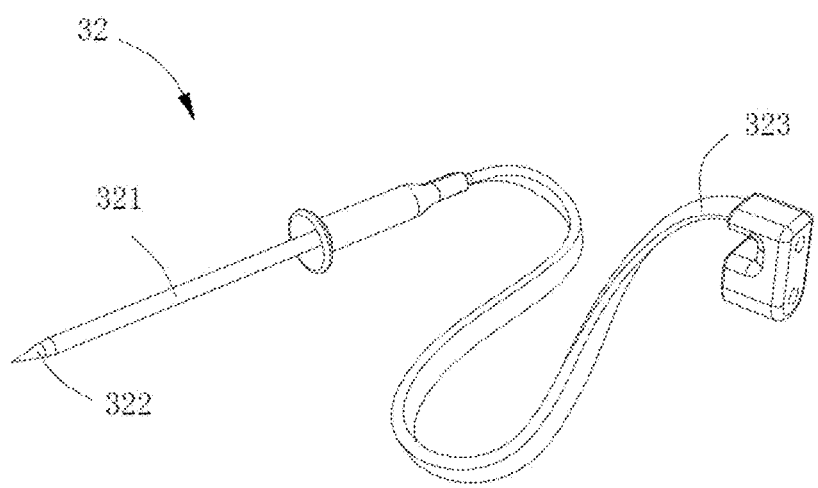
FIG. 4 is a perspective view of an object sensing module of the cooking apparatus according to the above preferred embodiment of the present invention.
Figure 5:
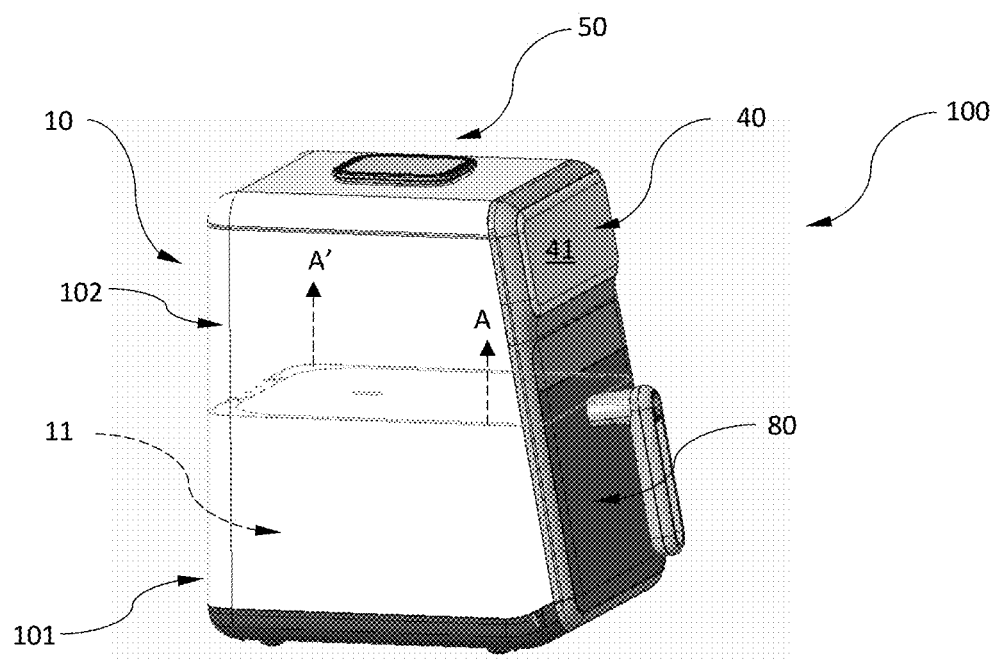
FIG. 5 is a perspective view of a cooking apparatus according to the above preferred embodiment of the present invention.

In particular, the detection of the inner temperature of the cooking object in the step (D) is processed by means of an object temperature sensing module 32 of the cooking apparatus 100 of the present invention, wherein the step (D) further comprises steps of:

(D.1) detecting the inner temperature of an inner portion of the cooking object by a thermistor 322 provided at a front end of a probe body 321 of the object temperature sensing module 32 (as shown in FIG. 4) of the cooking apparatus 100 by inserting the probe body 321 into the inner portion of the cooking object; and (D.2) obtaining the inner temperature of the inner portion of the cooking object through the detection of a resistance value of the thermistor 322 which varies with the inner temperature of the cooking object.

It is worth mentioning that, in the step (A), the heating unit 20 is actuated to generate thermal energy for cooking operation, wherein the heat energy generated by the heating unit 20 is transferred to the air in the cooking chamber 11 so that the ambient temperature of the cooking chamber 11 increases correspondingly. In the step (C), when the ambient temperature of the cooking chamber 11 reaches the predetermined set temperature T1, the heating unit 20 is controlled by the control unit 40 to maintain the ambient temperature of the cooking chamber at the predetermined set temperature T1. Specifically, the ambient temperature of the cooking chamber 11 can be maintained at the predetermined set temperature T1 by controlling a power supply of the heating unit 20. In other words, when the ambient temperature of the cooking chamber 11 rises and reaches the predetermined set temperature, a power supply loop of the heating unit 20 is disconnected to stop the running and operation of the heating unit 20, wherein when the ambient temperature of the cooking chamber 11 drops to lower than the predetermined set temperature due to the loss of heating source from the heating unit 20, the power supply loop of the heating unit 20 is switched on to supply heating energy to the cooking chamber 11 and the ambient temperature of the cooking chamber 11 rises back to the predetermined set temperature T1, such that the ambient temperature of the cooking chamber 11 is maintained at the predetermined set temperature by means of the cycling of the switching on and off of the heating unit 20. It is worth mentioning that when thyristor is alternatively embodied instead of the relays, the temperature environment of the cooking chamber 11 can be maintained by controlling a heating power of the heating unit 20, wherein the thyristor can control the power by controlling the conduction angle and conduction time of the thyristor and adjusting the intensity, frequency and other parameters of the alternating current.

It is understood that the predetermined set temperature T1 has no need to be a fixed value but preferred to be a temperature range having an upper limit and a lower limit, such that when the ambient temperature of the cooking chamber 11 reaches the upper limit of the predetermined set temperature T1, heating unit 20 is stopped to operate and produce heat, and that when the ambient temperature of the cooking chamber 11 is lower than or equal to the lower limit of the predetermined set temperature T1, the operation of the heating unit 20 is resumed, wherein a preferred temperature range difference between the upper limit and lower limit of the predetermined set temperature T1 is less than or equal to 10° C., so as to avoid the ambient temperature of the cooking chamber 11 is repeatedly increased frequency to prevent the loss of moisture of the cooking object and thus to ensure the taste of the cooked food.

In particular, in an alternative mode of the preferred embodiment of the present invention, the control of the heating unit 20 may also be accomplished by adjusting an electric current and/or voltage of the heating unit 20, thereby maintaining the ambient temperature of the cooking chamber 11 at the predetermined set temperature T1, i.e. by adjusting the electric current and/or voltage of the heating unit 20 to achieve a heating power supply adjustment of the heating unit 20. As in the step (A), by increasing the electric current and/or voltage of the heating unit 20, the heating energy produced by the heating unit 20 is increased correspondingly, so that the ambient temperature of the cooking chamber 11 can quickly reach the predetermined set temperature T1. In the step (C), by reducing the electric current and/or voltage of the heating unit 20, the heating energy produced by the heating unit 20 is reduced to avoid further increasing the ambient temperature of the cooking chamber 11 so as to significantly maintain the ambient temperature of the cooking chamber 11 at the predetermined set temperature T1.

It is worth mentioning that the appropriate cooking temperature T2 is determined according to the type of cooking object. In other words, when the cooking control method is processed to cook different types of food object, the appropriate cooking temperature T2 would be determined according to the specific type of cooking object to be cooked. For example, when the cooking object is meat, the appropriate cooking temperature is preferred to be set to trend to 70° C. to ensure the cooking object to be cooked at this temperature and not be overcooked at this temperature, so as to ensure the taste of the cooking object. Also, when the cooking object is vegetable, the appropriate cooking temperature T2 is preferred to be set to tend to 60° C. to ensure the cooking effect.

In other words, the appropriate cooking temperature T2 is determined according to the type of cooking object and the appropriate cooking temperature T2 is generally not a fixed value. Preferably, the appropriate cooking temperature is set to temperature range (greater than or equal to)≥40° C. and (less than or equal to)≤80° C., such that the cooking object is able to be cooked within this temperature range that the cooking object is heated within this temperature range while maintaining the moisture of the cooking object. Thus, excessive temperature heating and loss of moisture of the cooking object are avoided, so as to meet the cooking needs and taste requirements and to prevent the cooked object being too dry and hard.

In particular, in the step (E), the ambient temperature of the cooking chamber 11 is maintained at the appropriate cooking temperature T2 so that the cooking object is cooked in the heated cooking chamber 11 at the cooking temperature T2, that is, in this state, the surface heating temperature of the cooking object is consistent with the inner temperature of cooking object and the cooking object is gradually cooking until cooked, thereby substantially avoiding that the inner portion of the cooking object is undercooked when the outer portion of the cooking object is well cooked, or that the inner portion of the cooking object is well cooked but the outer portion of the cooking object is overcooked, which are caused by the inconsistency of the surface heating temperature and the internal heating temperature of the cooking object. In addition, it also prevents the excessive heating to the surface of the cooking object that results in a serious loss of surface moisture. Accordingly, the taste of the cooking object is guaranteed while it is nicely cooked.

It is worth mentioning that some cooking objects may not need to be fully cooked. The cooking state of the cooking object can be predetermined and set according to the type of the cooking object and the user's taste and requirement. Accordingly, the description "well cooked" in the present invention may refer to the cooked state desired by the user, such as rare, medium rare, medium, fully cooked, and the like when the cooking object is steak. The present invention should not be limited to the state of cooking.

In particular, in order to further prevent excessive loss of moisture during the cooking process of the cooking object, to avoid the cooking object being cooked overly dry and hard, and to ensure that the cooked object can have a tender taste, the step (E), further comprises steps of:

(E.1) increasing the ambient humidity of the cooking chamber 11 by a humidification unit 50 which is controlled by the control unit 40 of the cooking apparatus 100.

Specifically, the humidification unit 50 is configured to spray water mist in the cooking chamber 11 to increase the ambient humidity of the cooking chamber 11, so that during the cooking object being cooking at the appropriate cooking temperature T2, the heat produced in the cooking chamber 11 would mainly evaporate moisture in the cooking chamber 11, i.e. the water mist sprayed from the humidification unit 50 instead of the moisture of the cooking object, and thus the evaporation of the water content of the cooking object is greatly reduced, thereby avoiding excessive loss of moisture of the cooking object that generally causes the cooking object to taste dry and hard. Therefore, it facilitates the cooking process in the cooking chamber 11 effectively and ensures the desired taste of the cooking object.

It is worth mentioning that a humidification mode of the humidification unit 50 may be set according to the type of cooking object and/or the desired taste of cooking object to the user. As when the cooking object is a vegetable, the humidification unit 50 is preferred continuously increases the ambient humidity of the cooking chamber 11, such that the continuous supplement of the ambient humidity in the cooking chamber 11 substantially reduces the moisture loss of the cooking object so as to ensure that the cooking object has a tender taste. When the cooking object is French fries, the humidification unit 50 to the cooking chamber 11 is preferred to increase the ambient humidity in the cooking chamber 11 intermittently, such that the intermittent replenishment of the ambient humidity of the cooking chamber 11 substantially avoids, excessive loss of moisture of the cooking object, resulting that the cooking object can form a crispy taste to meet the user's taste requirements.

Further, in order to improve the aesthetic degree of the cooking object and to meet the user's requirements for taste, the cooking control method further comprises steps of:

(F) increasing the ambient temperature of the cooking chamber 11 by controlling the heating unit 20 after the cooking object is cooked to rapidly increase the surface temperature of the cooking object until Maillard browning occurs on the surface of the cooking object.

Specifically, the cooking object is cooked within an environment at the appropriate cooking temperature T2, i.e. the cooking chamber 11 being maintained in the appropriate cooking temperature T2 by the heating unit 20, while the supplement to the ambient humidity in the cooking chamber 11 in the step (E.1), so that the moisture of the cooking object after cooked is maintained ensuring the cooked object has the desired tender taste. At this time, the heating unit 20 is further controlled to rapidly increase the ambient temperature of the cooking chamber 11 so as to rapidly rise the surface temperature of the cooking object until Maillard browning occurs, that is a brownish color or deeper crust on the surface of the cooking object is occurred, such that a bright appearance for the cooked object is presented after the step (F), that not only improves the aesthetics of the cooked object but also provides a special taste to meet the user's taste requirements. In other words, due to the rapid increase of the surface temperature of the cooking object, a crispy taste of the cooking object is achieved while the inner portion of the cooking object remains a fresh and tender taste since it was cooked in the environment under the appropriate cooking temperature T2 with the replenishment of the moisture in the cooking chamber 11 for the inner portion of the cooking object by the humidification unit 50. Accordingly, the cooked object obtained after the step (F) can have a preferred taste of crispy outside and tender inside to fulfill the preferred taste requirement of the user.

Further, in order to enhance the cooking efficiency of the cooking control method and to ensure the degree of heat uniformity of the cooking object, the cooking control method further comprises a step of circulating an air flow in the cooking chamber 11 by means of an air flow unit 60 during the step (A), the step (C), the step (E), and the step (F), wherein the air flow unit 60 is configured and operated to drive a flow of air in the cooking chamber 11.

In particular, based on air driving and ventilating by the air flow unit 60, the thermal energy generated by the heating unit 20 can be rapidly transmitted in the cooking chamber 11 through the heated hot air that significantly and promptly increases the ambient temperature of the cooking chamber 11 so as to improve the heating efficiency of cooking object. In addition, the well ventilation and circulation of hot air in the cooking chamber 11 by means of the air flow driving of the air flow unit 60, the hot air can be evenly and well contacting with the entire surface of the cooking object for ensuring the desired cooking effect efficiently.

It is worth mentioning that the flow of air in the cooking chamber 11 contains the water moisture for the cooking object to be cooked therein and thus the taste of the cooking object can be ensured. In particular, during the step (A), the step (C) and the step (E), the air flow unit 60 is controlled in low-speed to drive the air flow in the cooking chamber 11 in order to improve the ambient temperature rising efficiency of the cooking chamber 11 while avoiding high-speed circulation of air and a large amount of moisture on the surface of the cooking object being removed with high-speed air that would cause the cooking object becoming dry and hard, and to ensure a heat uniformity of the cooking object. Further, in the step (F), the air flow unit 60 is controlled to drive the air flow in the cooking chamber 11 at high speed to rapidly increase the ambient temperature in the cooking chamber 11 so as to have a prompt rise of the surface temperature of the cooking object rapidly, such that due to the high-speed circulation of air, the surface moisture of the cooking object can be rapidly reduced, thereby facilitating the Maillard browning effect to the surface of the cooking object for the aesthetics of the cooking object. Accordingly, the cooking control method of the present invention ensures the desired taste and appearance of the cooking object at the same time.

Figure 2:
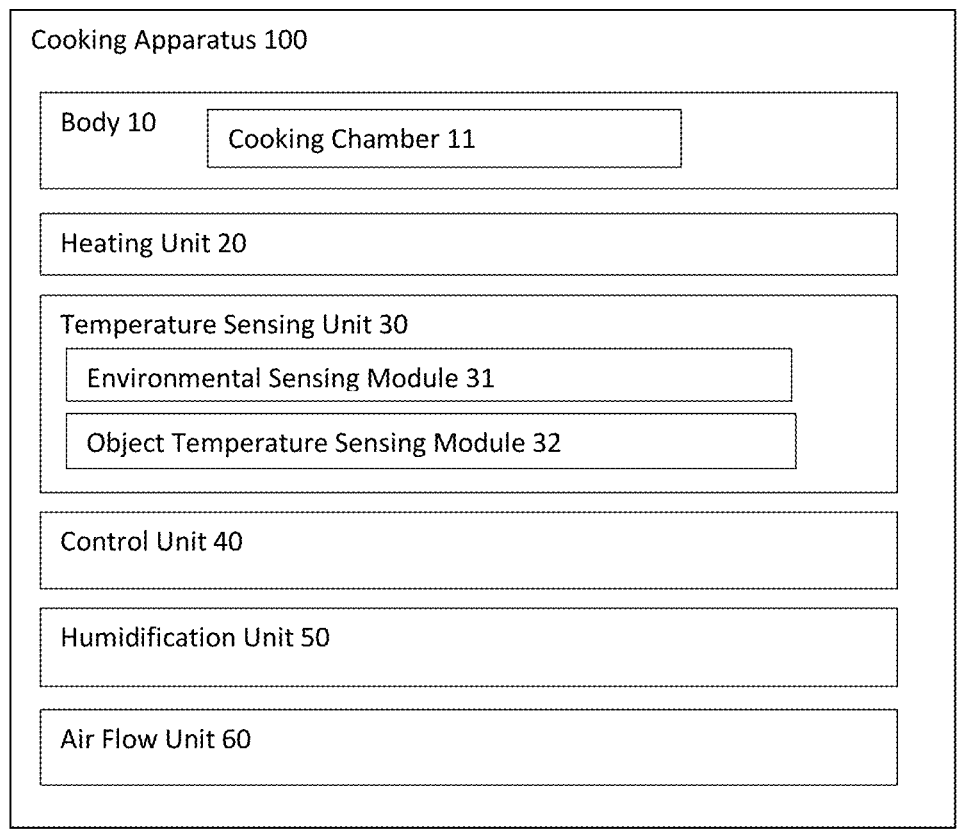
FIG. 2 is a schematic view illustrating the cooking apparatus according to the above preferred embodiment of the present invention.

Referring to FIG. 2, the cooking apparatus 100 according to the preferred embodiment of the present invention comprises a body 10, the heating unit 20, a temperature sensing unit 30, and a control unit 40. The body 10 has the cooking chamber 11 provided therein for containing the cooking object 11 to be cooked. The heating unit 20 can be electric heater installed in the body 10 to produce thermal energy to heat the cooking chamber 11 in predetermined and controllable manner by adjusting the ambient temperature of the cooking chamber 11. The temperature sensing unit 30 includes an ambient temperature sensing module 31 and an object temperature sensing module 32, wherein the ambient temperature sensing module 31 is installed in the body 10 and electrically connected with the control unit 40 to detect the ambient temperature of the cooking chamber 11, and the object temperature sensing module 32 is electrically connected with the control unit 40 for detecting the inner temperature of the cooking object. The temperature sensing unit 30 and the heating unit 20 are electrically connected and communicated to the control unit 40, wherein the control unit 40 is provided to control the heating work of the heating unit 20 according to the ambient temperature of the cooking chamber 11 and the inner temperature of the cooking object. Thus, based on the temperature of the detection results corresponding to the regulation of the cooking temperature to ensure the cooking effect, such that the cooking object can reach the desired state of ripeness and the desired taste after being cooked.

Figure 3:
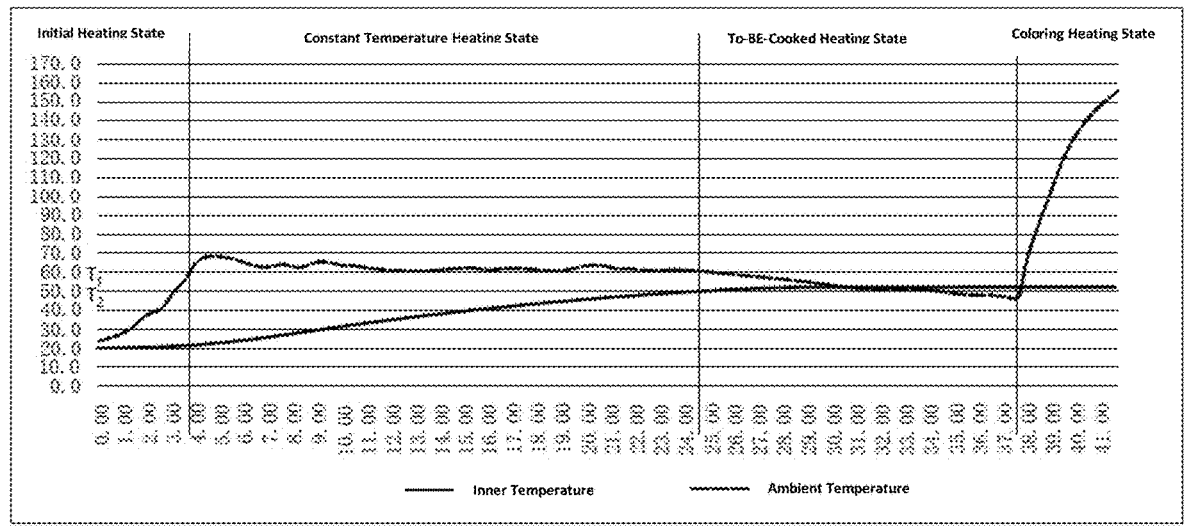
FIG. 3 is an exemplary view illustrating a working phase of the cooking apparatus according to the above preferred embodiment of the present invention.

Specifically, referring to FIG. 3, the cooking apparatus 100 is arranged to be operated with an initial heating state, a constant temperature heating state and a to-be-cooked heating state. Upon actuation of the cooking apparatus 100 to function, the cooking apparatus is arranged in the initial heating state. Then, sequentially, the cooking apparatus 100 is arranged to enter the constant temperature heating state once the ambient temperature of the cooking chamber 11 detected by the ambient temperature sensing module 31 reaches the predetermined set temperature T1, and the cooking apparatus 100 is arranged to enter the to-be-cooked heating state once the inner temperature of the cooking object detected by the object temperature sensing module 32 reaches the appropriate cooking temperature T2, wherein while the appropriate cooking temperature T2 is lower than the set temperature T1, the cooking object is cooked in the to-be-cooked heating state, such that the inner temperature and surface temperature of the cooking object can be maintained consistent to avoid serve and over loss of surface moisture of the cooking object due to the difference in inner temperature and surface temperature that may adversely affect the taste of the cooking object so as to ensure the desired cooking effect.

It is worth mentioning that the object temperature sensing module 32, which is used to detect the inner temperature of the inner portion of the cooking object, as shown in FIG. 4, includes a probe body 321, a thermistor 322 provided at a front end of the probe body 321 and a transmission element 323 configured to be electrically connected to the thermistor 322 and the control unit 40, wherein the thermistor 322 is configured to be inserted into the inner portion of the cooking object for detecting the inner temperature of the inner portion of the cooking object, wherein a resistance value of the thermistor 322 varies with the inner temperature of the cooking object and continuously transmits the current inner temperature of the cooking object to the control unit 40 via the transmission element 322.

In particular, the control unit 40 is arranged to control the heating unit 20 to rapidly heating up the cooking chamber 11 to gradually increase the ambient temperature of the cooking temperature during the initial heating state until the ambient temperature reaches the predetermined set temperature T1, wherein the heating unit 20 generates heat and transfer the heat to the air in the cooking chamber 11, so that the ambient temperature of the cooking chamber 11 rises correspondingly. When the ambient temperature of the cooking chamber 11 reaches the predetermined set temperature T1, the cooking apparatus 100 is switched to the constant temperature heating state, wherein the control unit 40 is arranged to control the heating unit 20 to produce more or less thermal energy correspondingly so as to maintain the ambient temperature of the cooking chamber 11 remaining at the predetermined set temperature T1 so that the cooking object is heated continuously at the predetermined set temperature T1 until the inner temperature of the inner portion of the cooking object is detected reaching the appropriate cooking temperature T2, and then the cooking apparatus switches into the to-be-cooked heating state, wherein the control unit 40 is arranged to control the heating unit 20 to produce adequate thermal energy to the cooking chamber 11 to maintain the ambient temperature of the cooking chamber 11 at the appropriate cooking temperature T2 so as to cook the cooking object at the appropriate cooking temperature T2. It is appreciated that, in the to-be-cooked heating state, the surface temperature of the surface portion and the inner temperature of the inner portion of the cooking object remain consistent, so as to avoid the defective that the inner portion of the cooking object is not under cooked while the surface portion of the cooking object is well cooked or over cooked due to the inconsistent of the surface temperature and the inner temperature of the cooking object being cooking, while also preventing the defective that the inner portion of the cooking object is well cooked but the surface of the cooking object is overcooked causing serve moisture loss in surface portion of the cooking object, thereby ensuring the taste of the cooking object while it is nicely and fully cooked at the same time.

It is appreciated that the heating unit 20 may be implemented to comprise heating element such as an electric heating tube, an electric heating plate, an electric heating wire, an electric heating film, and etc. that is capable of converting electrical energy into thermal energy to produce heat to the cooking chamber 11, wherein the control unit 40 can control the thermal energy supply of the heating unit 20 by controlling the power supply to the heating unit 20, such as by controlling the connecting or disconnecting of the power supply loop of the heating unit 20, i.e. to turn on or turn off of the heating unit 20. Alternatively, the control unit 40 may also control the thermal energy supply of the heating unit 20 by controlling the electrical current and/or voltage of the power supply of the heating unit 20, i.e. to adjust the power supply current and/or voltage of the heating unit 20 to achieve a heating power regulation of the heating unit 20.

Further, the cooking apparatus 100 includes a humidification unit 50 which is electrically connected and communicated with the control unit 40. The control unit 40 is arranged to control the humidification unit 50, especially during the to-be-cooked heating state to increase the ambient humidity of the cooking chamber 11, so as to avoid excessive loss of moisture of the cooking object due to the heating of the cooking object by increasing the environmental humidity of the cooking chamber 11, especially preventing the water content in the surface portion of the cooking object to be excessively evaporated due to the heating during the gradually cooking process so as to prevent the cooking object from being cooked too dry and hard to excessive loss of water content of the cooking object, thereby ensuring the taste of the cooking object.

In particular, the humidification unit 50 can be implemented by spraying water mist in the cooking chamber 11 to increase the ambient humidity thereof, for example, but not limited to, producing the water mist by means of ultrasonic atomization of the cooking chamber 11, by spraying water mist through a water pump, and etc. to increase the ambient humidity of the cooking chamber 11.

It is worth mentioning that the cooking apparatus 100 is capable of being processed in a coloring heating state, wherein the cooking apparatus 100 is arranged to enter the coloring heating state after the to-be-cooked heating state is operated for a predetermined set time which is determined according to the type of cooking object to be cooked. In the coloring heating state, the control unit 40 is arranged to control the heating unit 20 to rapidly heat the cooking chamber 11 to increase the ambient temperature of the cooking chamber 11 rapidly so as to promptly heat the surface portion of the cooking object to increase the surface temperature thereof rapidly until Maillard browning occurs, that is a brownish color or deeper crust on the surface of the cooking object is occurred, such that a bright appearance for the cooked object is presented that not only improves the aesthetics of the cooked object but also provides a special taste to meet the user's taste requirement as well as the practicality of the cooking apparatus 100.

Further, the cooking apparatus 100 includes an air flow unit 60 which is electrically connected and communicated with the control unit 40. The control unit 20 is arranged to control the air flow unit 60 driving air flow in the cooking chamber 11, thereby increasing the cooking efficiency of the cooking apparatus 100. The air flow driven by the air flow unit 60 ensures the degree of heat uniformity of the cooking object. In particular, the control unit 40 is arranged to control the air flow unit 60 to drive the air flow in low speed in the cooking chamber 11 during the initial heating state, the constant temperature heating state and the to-be-cooked heating state, so as to ensure that the water content and moisture of the cooking object would not be excessively lost while enhancing the ambient temperature rising efficiency of the cooking chamber 11 and the heat uniformity in the cooking chamber 11 with respect to the cooking object being cooked therein. In addition, the control unit 40 is arranged to drive the air flow at high speed in the cooking chamber 11 during the coloring heating state, so as to promptly increase the ambient temperature of the cooking chamber 11 to rapidly increase the surface temperature of the cooking object to rapidly heat the surface of the cooking object for facilitating the Maillard browning and coloring the surface of the cooking object by promptly reducing only the surface moisture of the cooking object by the high speed air circulation of air in the cooking chamber 11 for cooking and coloring without losing water content of the inner portion of the cooking object for cooking and coloring. In other words, the high speed air circulation of air in the cooking chamber will rapidly increase the surface temperature of the cooking object 200 while the inner portion of the cooking object 200 will not heat up due to the time required for heat transfer, such that the doneness of the cooking object 200 is controlled while having an effect of reducing the moisture loss of the inner portion of the cooking object 200.

It is worth mentioning that, according to the preferred embodiment of the present invention, the air flow unit 60 can be implemented as, but not limited to, a fan installed in the cooking chamber 11 of the body 10 for driving air flow in the cooking chamber 11, wherein when the air flow unit 60 is turned on, the air is directly blown and fanned to ventilate and circulate in the cooking chamber 11. In some embodiments, the air flow unit 60 may also be implemented as a fan installed outside the cooking chamber 11 and communicating with the cooking chamber 11 via an air circulation channel for driving air flowing in the cooking chamber 11 in a circulating manner.

It should be understood that the cooking apparatus 100 is allowed to be implemented as air fryer, oven and other cooking equipment that the present invention should not be limited.

Referring to FIG. 5 to FIG. 25, the cooking apparatus 100 is embodied as an air fryer that executes the cooking control method of the present invention, wherein the FIG. 5 to FIG. 13A are line drawings and the FIG. 14 to FIG. 25 are image drawings of the air fryer 100 according to the preferred embodiment of the present invention. The air fryer (cooking apparatus) 100 comprises the body 10, the heating unit 20, the temperature sensing unit 30, the control unit 40, the humidification unit 50, and the air flow unit 60. The body 10 is arranged to define the cooking chamber 11 within a lower portion 101 and a receiving cavity 12 in an upper portion 102 to install the heating unit 20, the ambient temperature sensing module 31 of the temperature sensing unit 30, the control unit 40, the humidification unit 50, and the air flow unit 60 therein. The cooking chamber 11 has a chamber opening 111 at a front side of the body 10 for disposing a cooking object 200 to be cooked in the cooking chamber 11.

Figure 7:
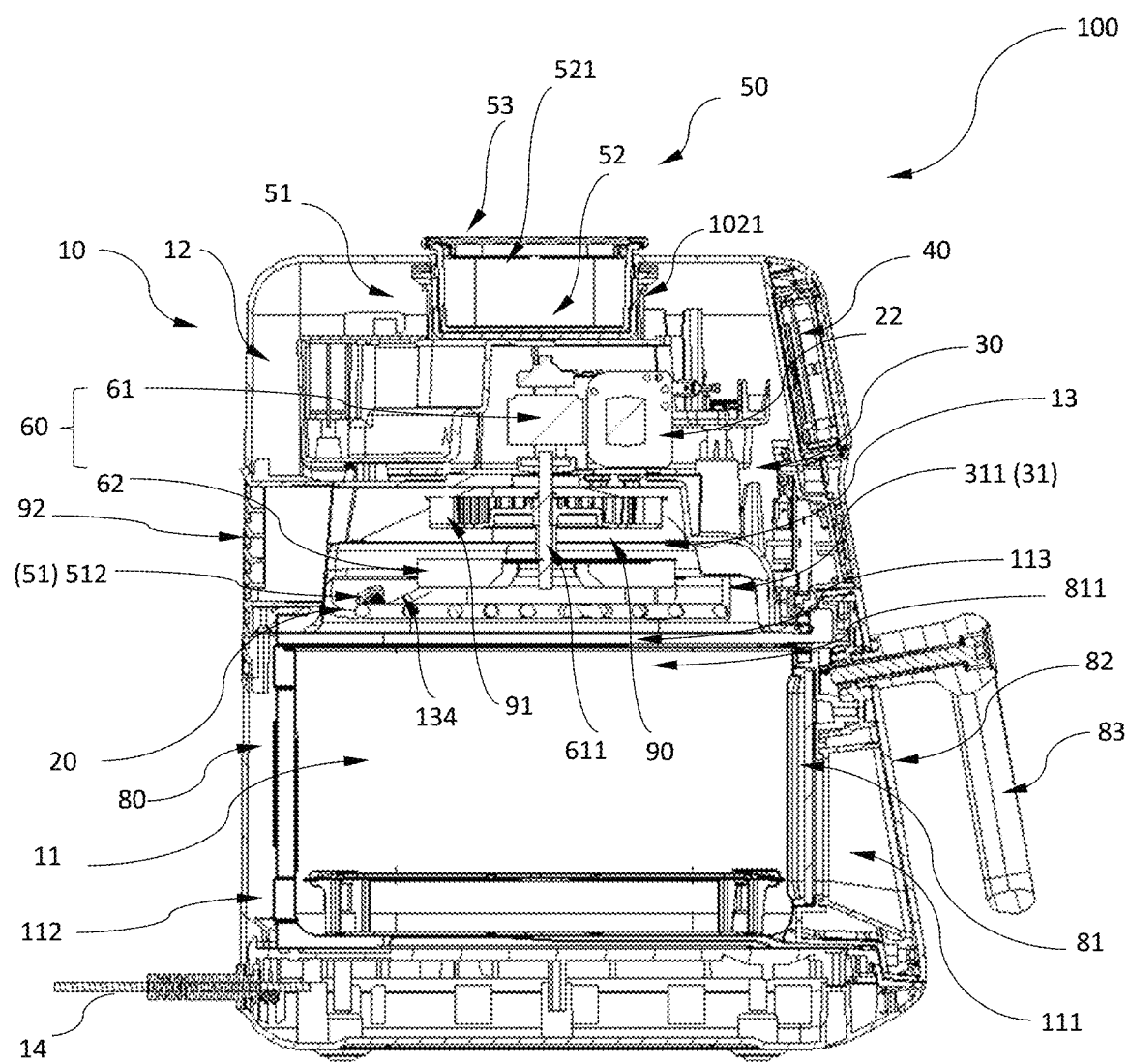
FIG. 7 is a vertical sectional view of the cooking apparatus according to the above preferred embodiment of the present invention.
Figure 8:
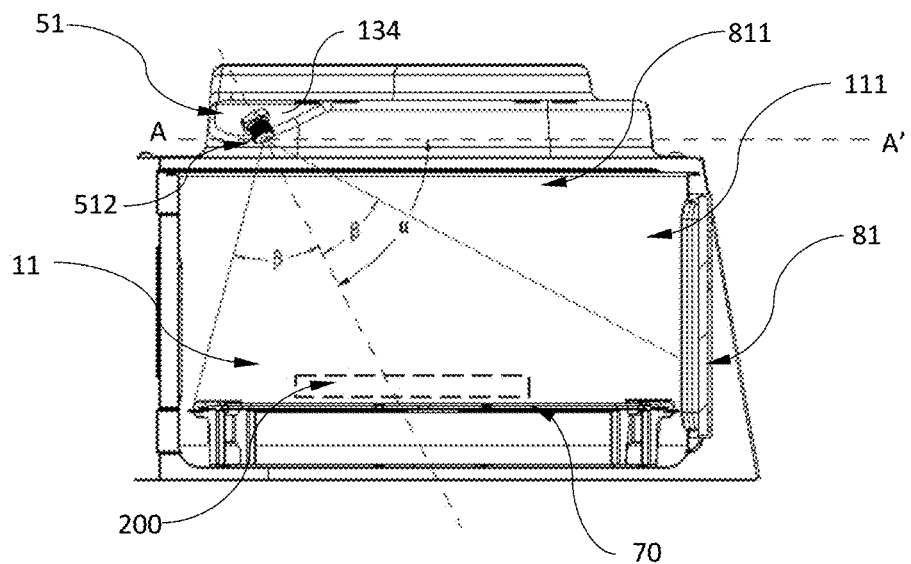
FIG. 8 is a partial sectional view illustrating the cooking chamber of the cooking apparatus according to the above preferred embodiment of the present invention.
Figure 9:
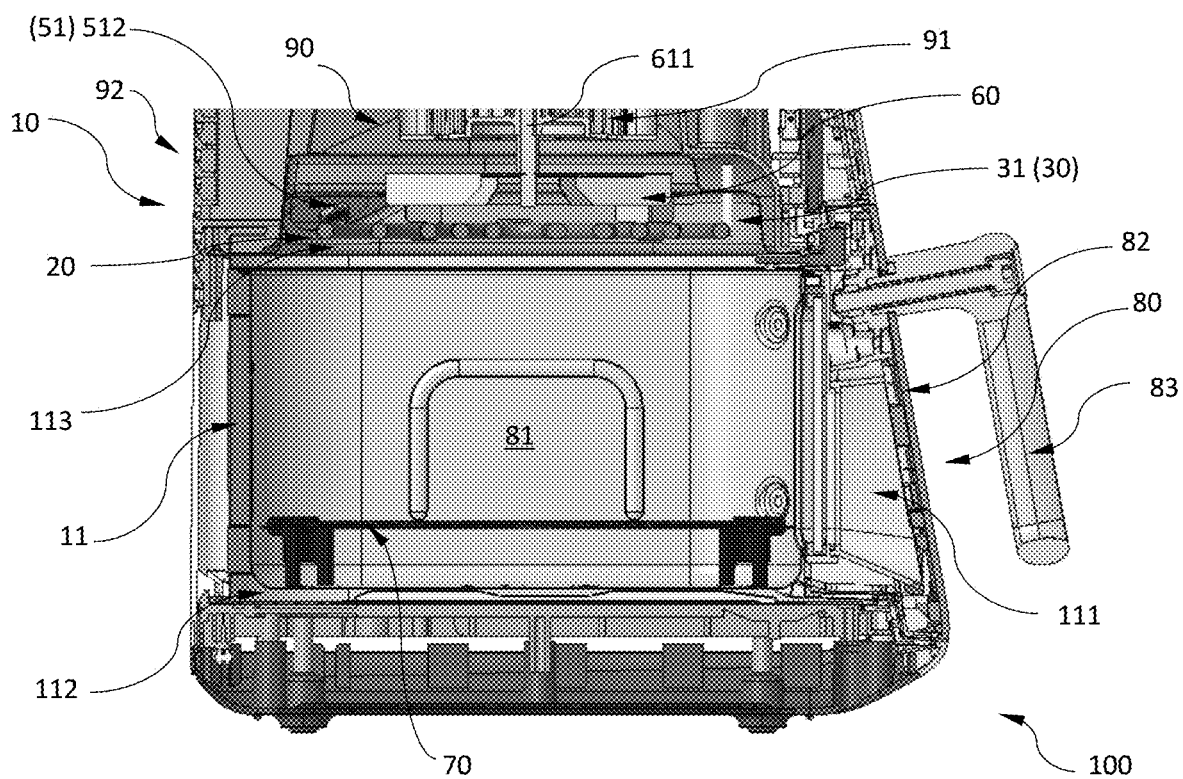
FIG. 9 is a partial sectional view illustrating a cooking environment incorporated by the cooking chamber drawer, the heating unit and the mist nozzle of the water mist generating device according to the above preferred embodiment of the present invention.
Figure 24:
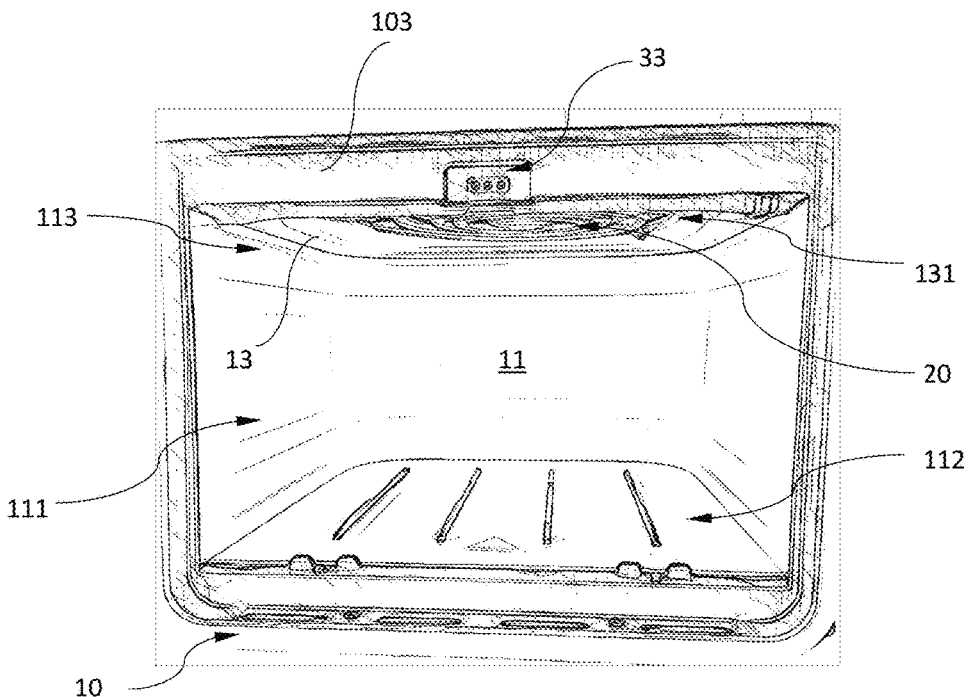
FIG. 24 is an enlarged front perspective view illustrating the cooking chamber of the cooking apparatus according to the preferred embodiment of the present invention.

The cooking chamber 11, which is embodied as rectangular chamber having a curved surrounding wall, further has a cooking surface 112 at a bottom thereof and a ceiling portion 113, as shown in FIG. 7, FIG. 9 and FIG. 24.

Figure 22:
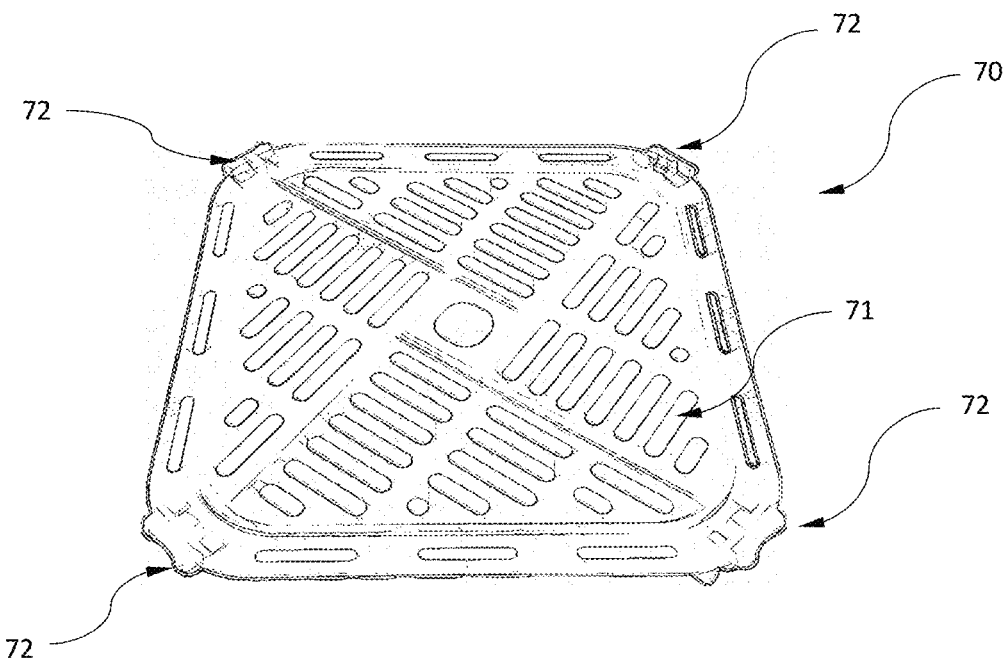
FIG. 22 is a top perspective view of the cooking grill of the cooking apparatus according to the preferred embodiment of the present invention.
Figure 23:
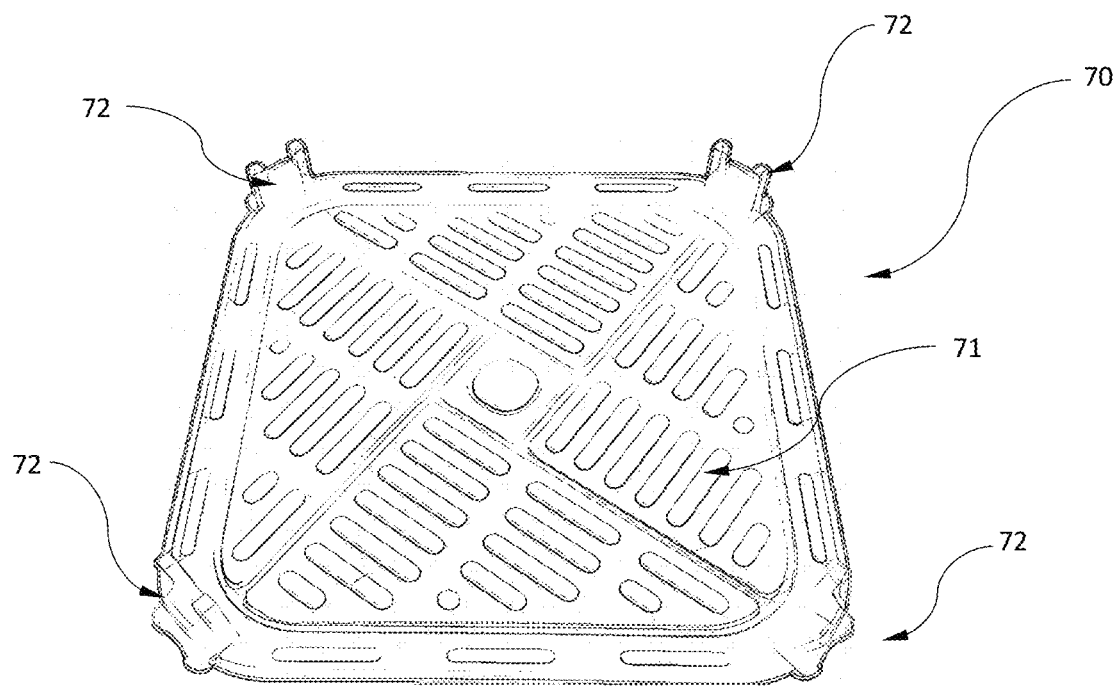
FIG. 23 is a bottom perspective view of the cooking grill of the cooking apparatus according to the preferred embodiment of the present invention.

The cooking object 200 can be directly placed in the cooking chamber 11 (as shown in 24) while the cooking chamber cooking apparatus 100 may has a chamber door to close the chamber opening 111 while cooking. According to the preferred embodiment of the present invention, the air fryer 100 further comprises a cooking grill 70, as shown in FIG. 22 and FIG. 23, which is configured to be disposed on the cooking surface 112 and adapted for the cooking object 200 to be placed therein so that the cooking object 200 is elevated above the cooking surface 112 to allow heated air flow circulating within the cooking chamber 11 also contacting with the bottom surface of the cooking object 200.

Figure 10:
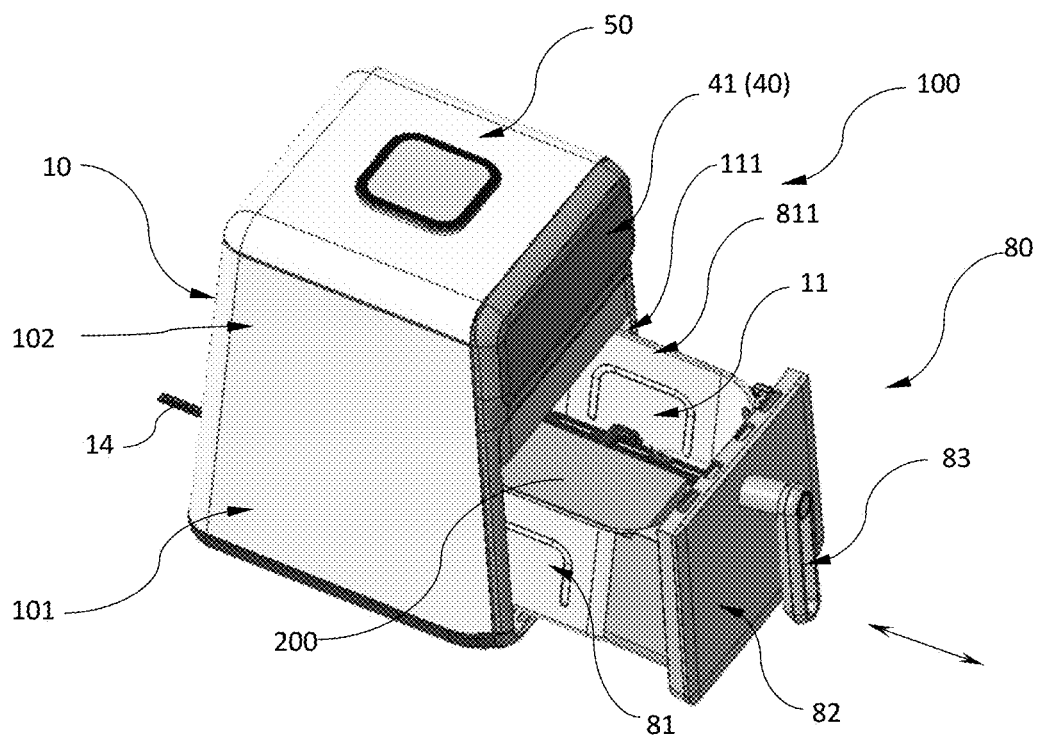
FIG. 10 is a partial exploded view of the cooking apparatus according to the preferred embodiment of the present invention.
Figure 11:
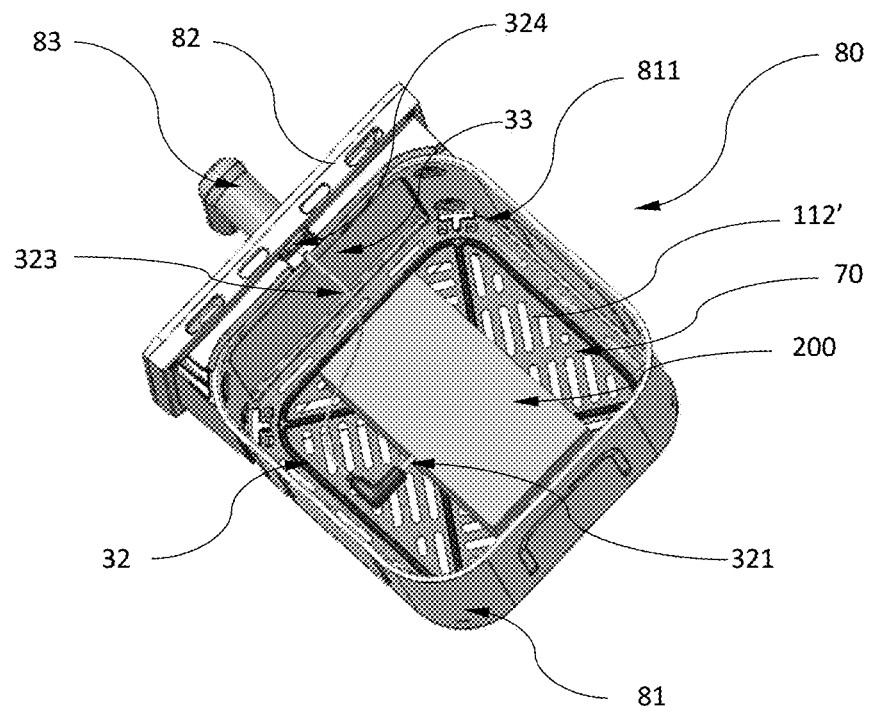
FIG. 11 is a perspective of the cooking chamber drawer according to the preferred embodiment of the present invention.
Figure 12:
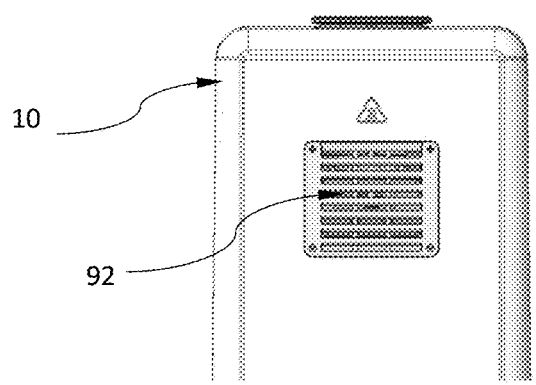
FIG. 12 is a partial rear view illustrating a heat dissipating window of the cooking apparatus according to the preferred embodiment of the present invention.
Figure 20:
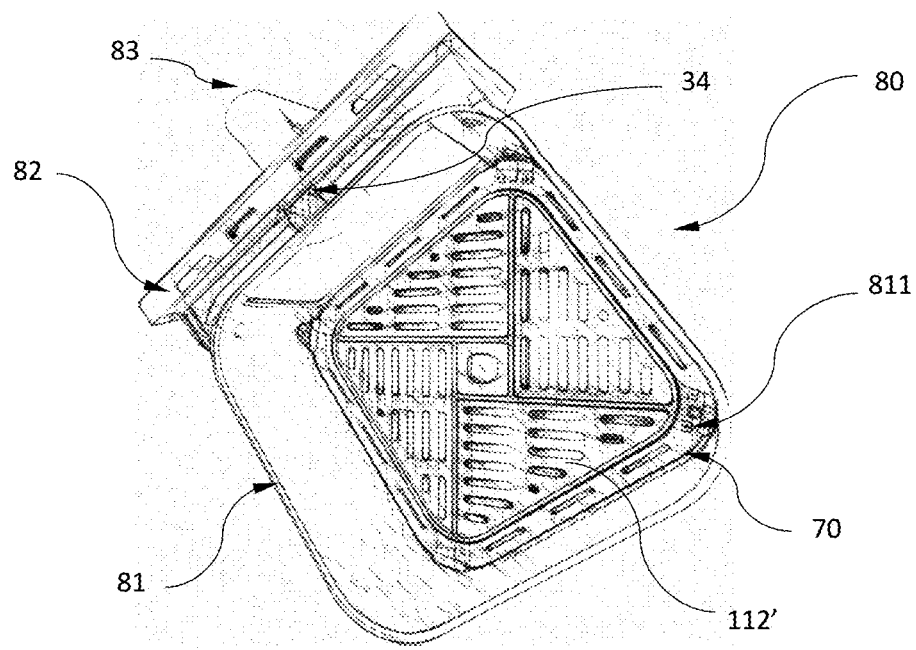
FIG. 20 is a perspective view of the cooking chamber body with the cooking grill disposed therein of the cooking apparatus according to the preferred embodiment of the present invention.

Referring to FIG. 10 and FIG. 11, in order to facilitate cleaning of the air fryer 100, preferably, the air fryer 100 further comprises a cooking drawer 80 having a size slightly smaller than the cooking chamber 11 so as to be fittingly disposed in the cooking chamber 11. The cooking drawer 80 comprising a drawer body 81 having a top opening 811 to communicate with the ceiling portion 113 of the cooking chamber 11 when the cooking drawer 80 is inserted into the cooking chamber 11 through the chamber opening 111 (as shown in FIG. 7) and a front panel 82 sized and configured to sealingly close the chamber opening 111 after the cooking chamber 11 is inserted and placed in the cooking chamber 11, as shown in FIG. 9 and FIG. 10. The cooking drawer 80 is preferred to further comprise a handle 83 connected to the front panel 82 for ease of inserting in and withdrawing out of the cooking chamber 11. When the air fryer 100 is equipped with the cooking drawer 80 placed in the cooking chamber 11 of the body 10, the interior cavity defined in the drawer body 81 becomes the effective portion of the cooking chamber 11 and thus the cooking grill 70 is preferred to be fittingly placed on a bottom 812 of the drawer body 81 of the cooking drawer 80 for the cooking object 200 being disposed thereon. It is worth mentioning that when the cooking grill 70 is placed on the bottom 812 of the drawer body 81 of the cooking drawer 80, a top surface of the cooking grill 70 serves as a cooking surface 112' of the cooking chamber 11, as shown in FIG. 11 and FIG. 20.

Figure 6:
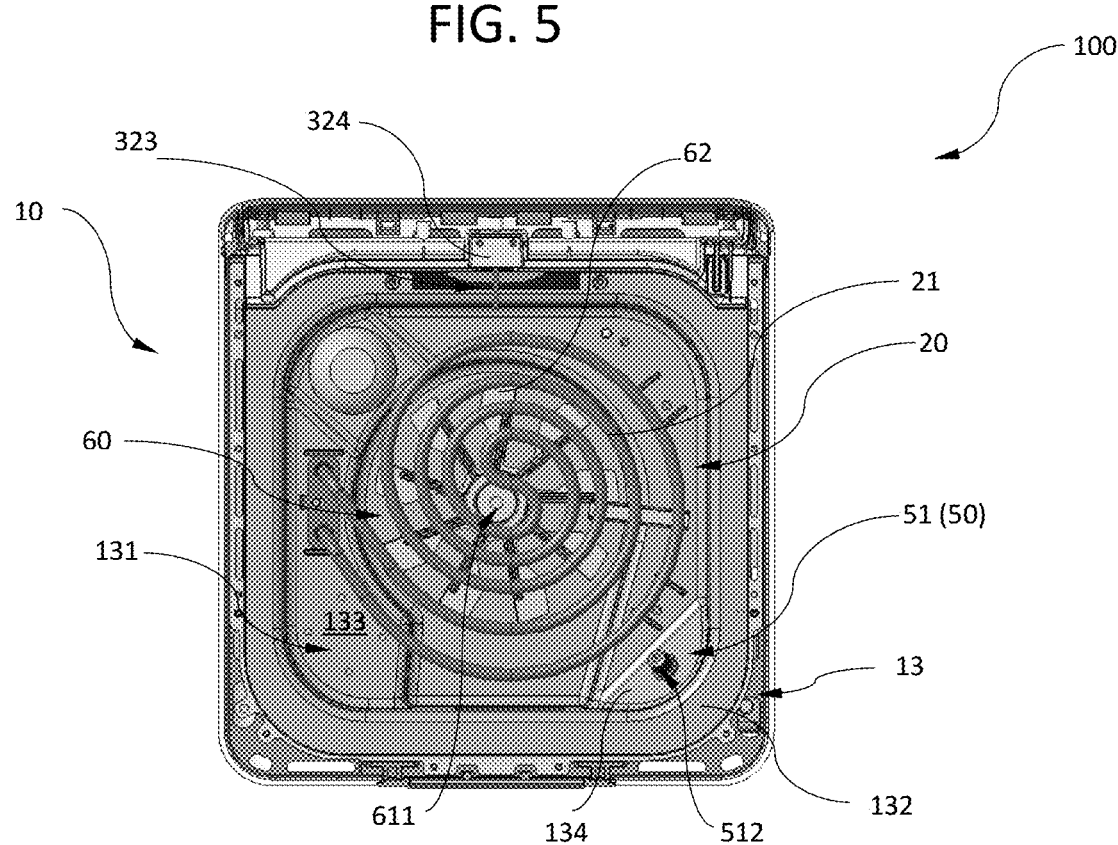
FIG. 6 is a horizontal sectional view of FIG. 5 along a section plane A-A', illustrating the heating unit, the air blower and the water mist generating device of the cooking apparatus, according to the above preferred embodiment of the present invention.
Figure 25:
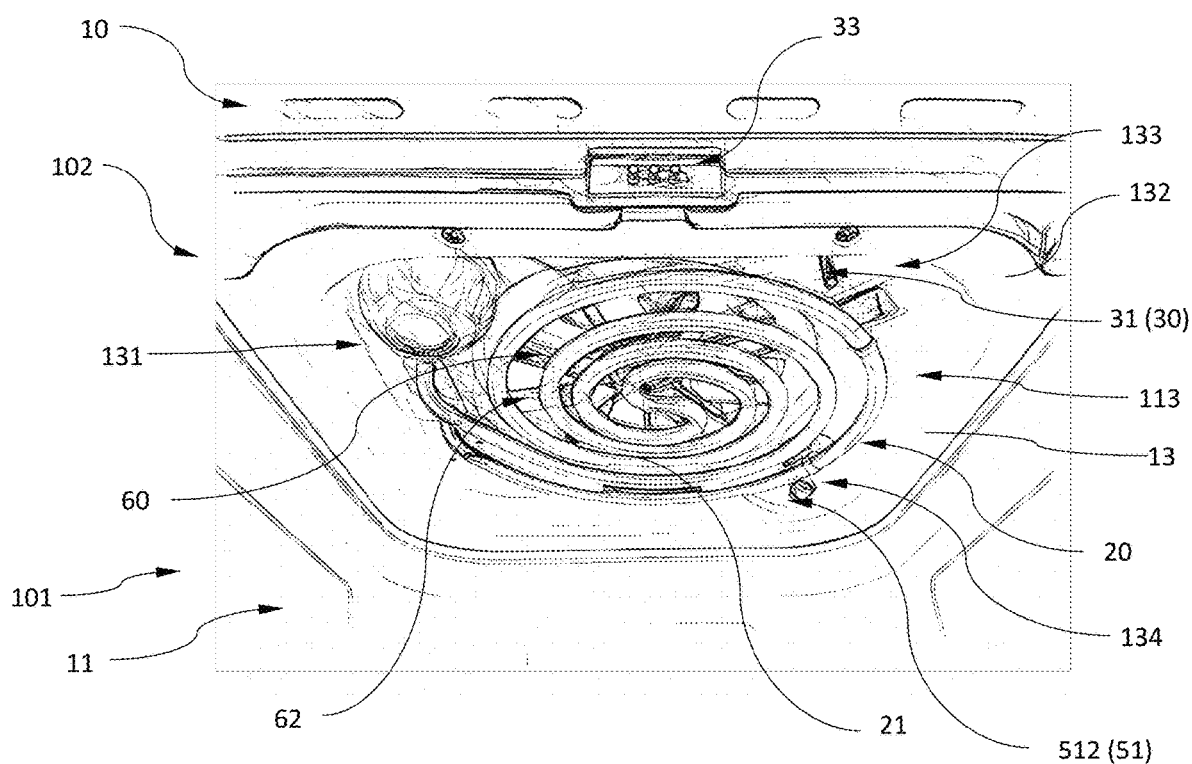
FIG. 25 is an enlarged perspective view illustrating a ceiling portion of the cooking chamber of the cooking apparatus according to the preferred embodiment of the present invention.

Referring to FIGS. 6, 7, 9, 24, and 25, The heating unit 20 comprises one or more electric heating elements 21, embodied as one or more electric heating tubes arranged in a spiral manner and mounted in a heating groove 131 indently formed in a supporting wall 13 arranged between the lower portion 101 and the upper portion 102 of the body 10, as shown in FIG. 6 and FIG. 25. The heating unit 20 further comprises an electric heater 22 installed in the receiving cavity 12 in the upper portion 102 of the body 10 and electrically connected with the control unit 40 and a power source through a power cable 14 and the electric heating elements 21, as shown in FIG. 7. The electric heater 22 heats up the one or more heating elements 21 to produce thermal energy to heat the cooking chamber 11 in predetermined and controllable manner by adjusting the ambient temperature of the cooking chamber 11.

The air flow unit 60 comprises an electric motor 61 and an air blower 62, embodied as a fan member, preferably arranged between the supporting wall 13 and the one or more heating elements 22 in a rotatable manner, as shown in FIG. 7 and FIG. 25, wherein the electric motor 61 is electrically connected with the control unit 40 and the power cable 14 to drive the air blower 62 to rotate and drive a flow of air in the cooking chamber 11.

According to the preferred embodiment, since the air blower 62 is rotatably positioned adjacently above the spiral heating elements 21 which generates thermal energy to heat up the air contained in the cooking chamber 11, the air blower 62 is capable of blowing an air flow circularly downwards to drive the heated air in the cooking chamber 11 to distribute evenly and effectively. At the same time, the supporting wall 13 forms a reflective surface correspondingly to work with the air blower 62 to ensure the thermal energy produced by the one or more heating elements 21 heating up the air flow within the cooking chamber 11. Accordingly, based on air driving and ventilating by the air blower 62 of the air flow unit 60, the thermal energy generated by the one or more heating elements 21 of the heating unit 20 can be rapidly transmitted in the cooking chamber 11 through the heated hot air that significantly and promptly increases the ambient temperature of the cooking chamber 11 so as to improve the heating efficiency of cooking object. It is appreciated that the well ventilation and circulation of hot air in the cooking chamber 11 by means of the air flow driving of the air blower 62, the hot air can be evenly and well contacting with the entire surface of the cooking object 200 for ensuring the desired cooking effect efficiently.

Referring to FIG. 7 and FIG. 11, the temperature sensing unit 30 includes the ambient temperature sensing module 31 and the object temperature sensing module 32, wherein the ambient temperature sensing module 31, which is installed in the receiving cavity 12 of the upper portion 102 of the body 10 and electrically connected with the control unit 40, comprises a temperature sensing probe 311 downwardly extended to the heating groove 131, preferably extended to the ceiling portion 113 of the cooking chamber 11, to detect the ambient temperature of the cooking chamber 11.

Figure 21:
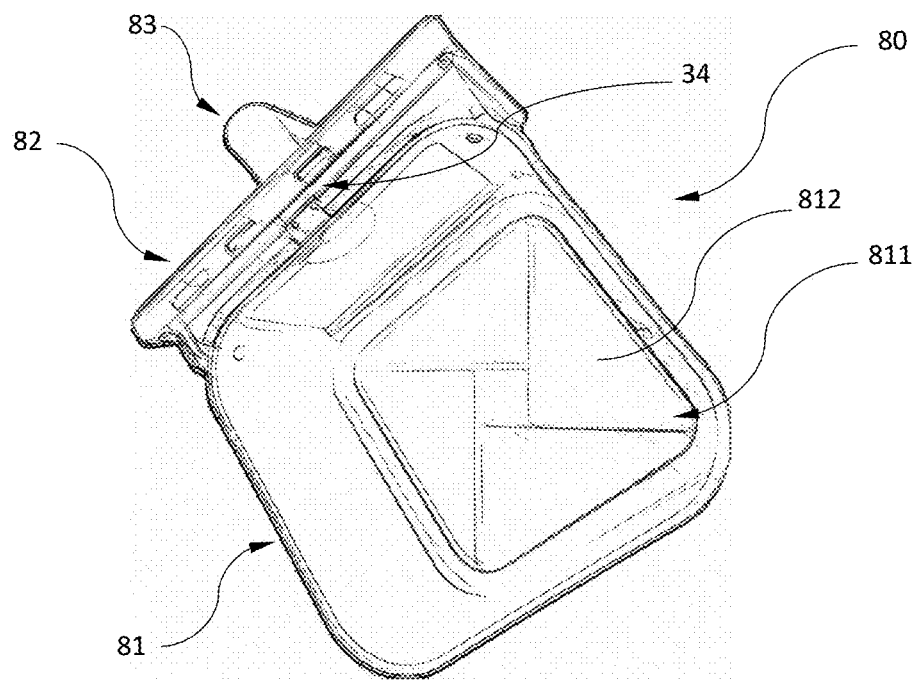
FIG. 21 is a perspective view of the cooking chamber body of the cooking apparatus according to the preferred embodiment of the present invention.

Referring to FIG. 10 and FIG. 11, the object temperature sensing module 32, further comprises a detachable connecter terminal 324 connected to an end of the transmission element 323 for detachably mounted in a terminal slot 34 indented in a top edge of the front panel 82 of the cooking drawer 80 (as shown in FIG. 20 and FIG. 21). The temperature sensing unit 30 correspondingly comprises a sensor terminal 33 provided in a top lintel 103 of the body right above the chamber opening 111, as shown in FIG. 24 and FIG. 25, so that the object temperature sensing module 32 can be detached from the air fryer 100 for ease of storage and cleaning and be mounted in the cooking drawer 80 by inserting the connecter terminal 324 in the terminal slot 34. When the cooking drawer 80 is inserted in the cooking chamber 11 until the front panel 82 pressing against the top lintel 103, the sensor terminal 33 is electrically connected with the connecter terminal 324 so as to connect to the control unit 40 for detecting the inner temperature of the cooking object 200 by inserting the probe body 321 into the cooking object 200 until the front end thermistor 322 of the probe body 321 reaches a desired inner portion of the cooking object 200.

In other words, when the cooking drawer 80 is placein position, the temperature sensing unit 30 and the heating unit 20 are electrically connected and communicated to the control unit 40, wherein the control unit 40 is provided to control the heating work of the heating unit 20 according to the ambient temperature of the cooking chamber 11 and the inner temperature of the cooking object 200. Thus, based on the temperature of the detection results corresponding to the regulation of the cooking temperature to ensure the cooking effect, such that the cooking object 200 can reach the desired state of ripeness and the desired taste after being cooked.

Referring to FIG. 7 and FIG. 9, the air fryer 100 further comprises a heat dissipating device 90 which comprises a fan blower 91 arranged between the one or more heating elements 21 of the heating unit 20 and the control unit 40, preferably positioned immediately above the supporting wall 13, and a dissipating window 92 formed at a rear wall of the body 10. It is appreciated that the fan blower 91 and the air blower 62 are coaxially connected to the motor 61 with the same driving shaft 611 and that the supporting wall 13 also functions as an insulation wall to help to insulate the heat transferred from the one or more heating elements 62 into the receiving cavity 12 where the control unit 40 is installed therein. When the motor 61 is powered to drive the air blower 62 to rotate, the fan blower 91 is rotated by the driving shaft 611 to dissipate the heat through the dissipating window 92 so as to avoid the electrical components such as the control unit 40, the motor 61, and the ambient temperature sensing module 31 installed in the receiving cavity 12 of the body 10 to function in an over hot environment to ensure their normal working conditions.

Referring to FIG. 22 and FIG. 23, the cooking grill 70 has a plurality of grill slots 71 formed therein and four standing legs 72 downwardly extended from four corners to elevate the cooking grill 70 on the bottom 812, such that the grease oil and/or fluid generated while cooking the cooking object 200 will drop onto the bottom 812 of the drawer body 81 of the cooking drawer 80, as shown in FIG. 7, FIG. 20 and FIG. 21.

Figure 16:
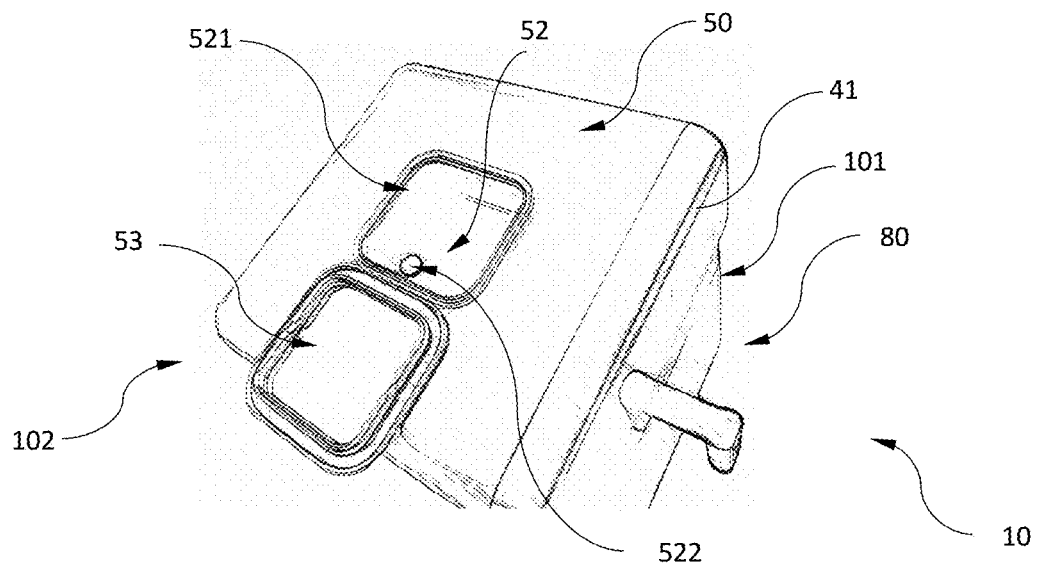
FIG. 16 is a top perspective view illustrating the water container and the container cover provided on top of the cooking apparatus according to the preferred embodiment of the present invention.
Figure 17:
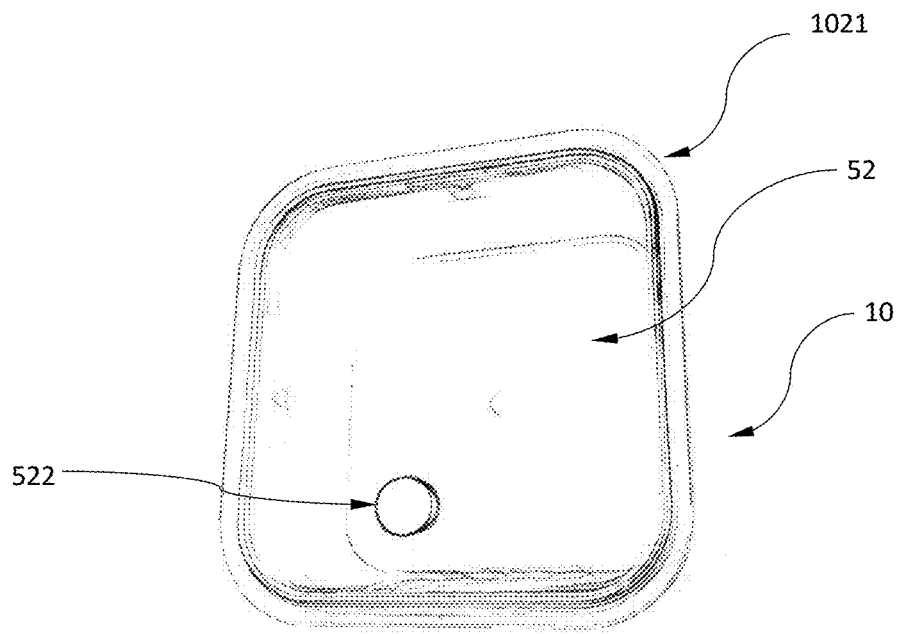
FIG. 17 is an enlarged perspective view of the water container of the cooking apparatus according to the preferred embodiment of the present invention.
Figure 18:
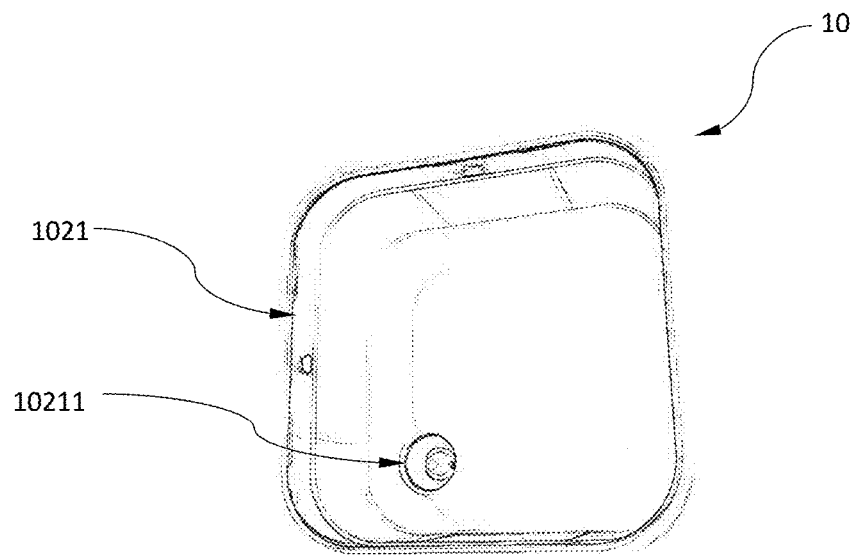
FIG. 18 is an enlarged perspective view illustrating the water container slot of the cooking apparatus according to the preferred embodiment of the present invention.
Figure 19:
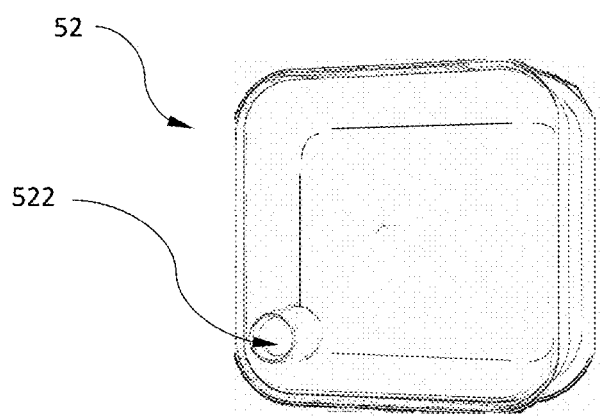
FIG. 19 is a rear perspective view of the water container of the cooking apparatus according to the preferred embodiment of the present invention.

Referring to FIGS. 6-8, 16-19, and 25, as mentioned above, the humidification unit 50 is configured to spray water mist in the cooking chamber 11 to increase the ambient humidity of the cooking chamber 11, wherein the humidification unit 50 comprises a water mist generating device 51 above the cooking chamber 11 and comprises a water container 52 (as shown in FIG. 18) arranged in the upper portion 102 of the body 10 for containing a predetermined amount of clean water. According to the preferred embodiment, the water container 52 is fittingly received in a container cavity 1021 formed in a top wall of the upper portion 102 of the body 10 (as shown in FIG. 18) and a container cover 53 configured to cover a top opening 521 of the water container 52 (as shown in FIG. 7 and FIG. 16). The container cavity 1021 has a water outlet 10211 (as shown in FIG. 18) and the water container 52 comprises an outlet valve 522 (as shown in FIG. 16 and FIG. 17) configured to be connected with the water outlet 10211 when the water container 52 fitted into the container cavity 1021.

Figure 13A:
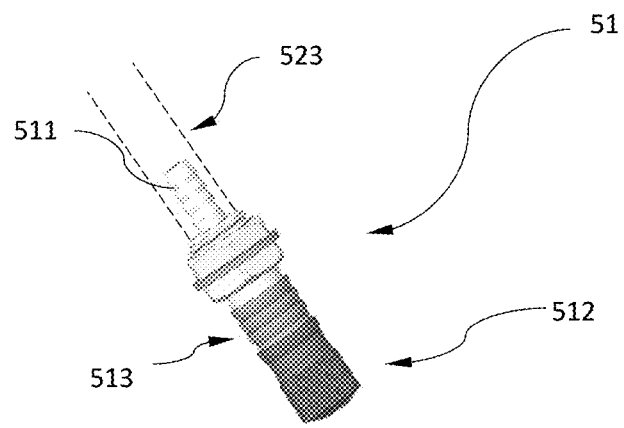
FIG. 13A and FIG. 13B are perspective views of the mist nozzle of the water mist generating device of the cooling apparatus according to the preferred embodiment of the present invention.
Figure 13B:
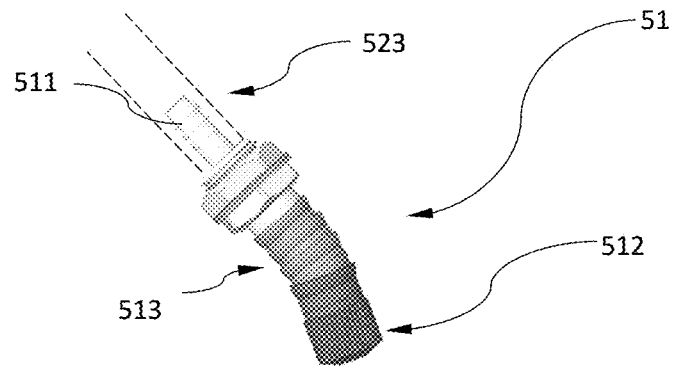
Figure 14:
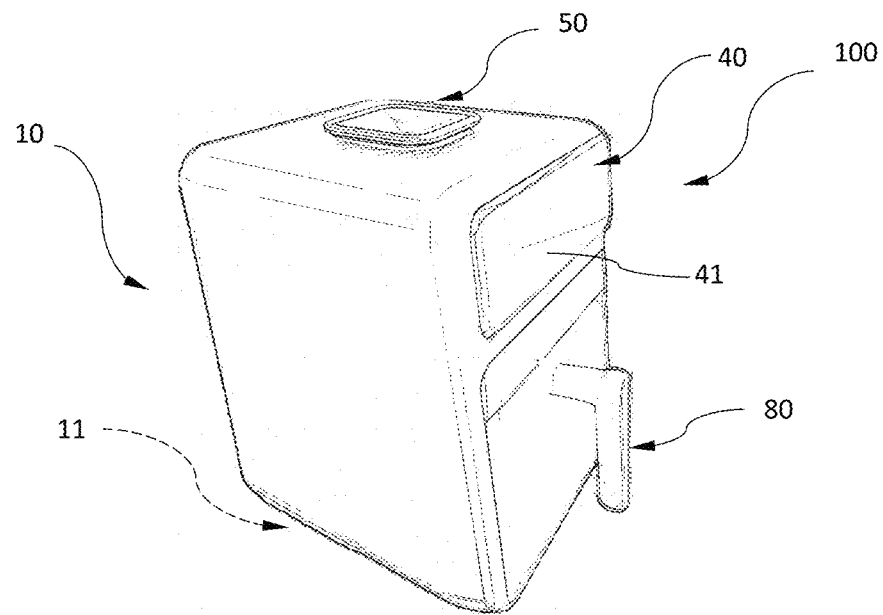
FIG. 14 is a perspective view of the cooking apparatus according to the preferred embodiment of the present invention.
Figure 15:
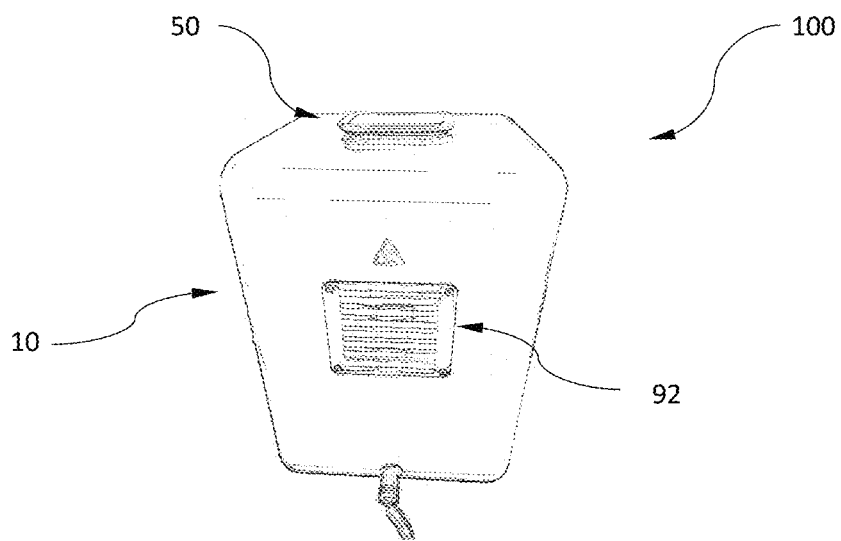
FIG. 15 is a rear perspective view of the cooking apparatus according to the preferred embodiment of the present invention.

Referring to FIG. 13A and FIG. 13B, the water mist generating device 51 is configured to generate water mist from liquid water, wherein the water mist generating device 51 comprises an inlet head 511 at one end, a mist nozzle 512 at the other end thereof and an angular adjusting member 513 connected between the inlet head 511 and the mist nozzle 512. In one embodiment, the mist nozzle 512 which is communicating with the water container 52 can be positioned at or above the ceiling portion 113 of the cooking chamber 11 for converting the water from the water container 52 to water mist and spraying the water mist at a predetermined speed, wherein the mist nozzle is adjustable for a desired spraying angle θ to ensure the mist to be sprayed on one or more surfaces of the cooking object 200 disposed in the cooking chamber 11.

During cooking of cooking object 200 such as all kinds of meat in a cooking apparatus 100 likes air fryer, oven and the like, the excessive loss of water moisture in the surface portion of the cooking object 200 is the main reason of losing favor and causing the cooking object 200 to taste dry and hard. To add water vapor in the cooking chamber 11 is a conventional means to increase the humidification helps to reduce the rapid loss of water moisture in the cooking object 200. According to the preferred embodiment of the present invention, an advantage of the invention is to apply water mist not only in the cooking chamber 11 through the water mist generating device 51 but also to apply water mist on one or more surfaces of the cooking object 200 in the cooking chamber 11 so as to avoid excessive heating of the one or more surfaces of the cooking object 200 and an over loss of the surface moisture in the surface portion of the cooking object 200 while cooking at the appropriate cooking temperature when the cooking chamber 11 is maintained at the appropriate cooking temperature, greater than or equal to 40° C. and less than or equal to 80° C., when the inner temperature of the cooking object reaches the appropriate cooking temperature. In order to cook the cooking object 200 to a desired flavor, a predetermined moisture of the inner portion and the surface portion of the cooking object 200 is desired by the chef, if the surface moisture of the surface portion of the cooking object 200 reduces beyond the predetermined moisture, it is considered as over loss of the surface moisture and causes loss of flavor and taste of the cooking object 200.

Referring to FIG. 6 to FIG. 9, the water mist generating device 51 is configured to be arranged in the heating groove 131 and positioned right above the ceiling portion 113 of the cooking chamber 11 while the mist nozzle 512 thereof is preferred to be positioned and extended to close to ceiling portion 113 of the cooking chamber 11 for spraying water mist into the cooking chamber with predetermined and adjustable angle and range, wherein water reserved in the water container 52, which is linked to the water mist generating device 51 via the outlet valve 522 (as shown in FIG. 16 and FIG. 17), is supplied to the water mist generating device 51 through, for example, a water tube 523 having one end connected to the water mist generating device 51 and another end connected to the outlet valve 522.

As shown in FIG. 6 and FIG. 7, the heating groove 131 is indented from a lower surface 132 towards an upper surface 133 of the supporting wall 13 of the body 10 for a height to define a space shaped and sized enough to receive the heating elements 21 of the heating unit 20 and the air blower 62 therein, wherein a mounting surface 134 is slantly extended from the lower surface 132 towards the upper surface 133, preferably formed at a corner portion of the heating groove 131 having an installation angle ranged 30° to 60° with respect to a horizontal line A-A' of the supporting wall 13, as shown in FIG. 6, depending on the shape and size of the cooking chamber 11.

Referring to FIG. 6, the water mist generating device 51 is mounted on the mounting surface 134 in such a manner that the mist nozzle 512 is arranged inclinedly downwards to eject and spray water mist from the mist nozzle 512 in conical shape, wherein when an spraying angle of the mist nozzle is (3, the installation angle of the mist nozzle 512 is a with respect to the horizontal line A-A' and a distance between the cooking grill and the mist nozzle is D, by adjusting the relationship between the spraying angle β, the installation angle α and the distance D, the area on the plane of the water mist can be ensured to be evenly sprayed to the cooking grill, i.e. the surface of the cooking object 200, to reach more than 80%. Accordingly, when the cooking object 200 is disposed on top of the cooking grill 70 placed in the cooking drawer 80, or alternatively on the cooking surface 112, the water mist ejected and sprayed from the mist nozzle 512 of the water mist generating device 51 substantially reaches the top surface and four side surfaces of the cooking object 200, such that the water moisture of the surface portion of the cooking object 200 is increased to prevent excessive heating of the top and side surfaces of the cooking object 200 and an over loss of the surface moisture in the surface portion of the cooking object 200 while cooking at the appropriate cooking temperature when the cooking chamber 11 is maintained at the appropriate cooking temperature, greater than or equal to 40° C. and less than or equal to 80° C., when the inner temperature of the cooking object reaches the appropriate cooking temperature. In other words, the water mist ejected from the mist nozzle 512 and the water mist generating device 51 is configured to spray over the entire cooking surface 112 or the entire top surface of cooking grill 70 when the cooking grill 70 is placed in the cooking chamber 11 or the cooking drawer 80, so as to ensure at least the top surface of the cooking object 200 disposed on the cooking surface 112 or the cooking grill 70 can be sprayed with the water mist.

In addition, the water mist sprayed in the cooking chamber 11, before reaching the surfaces of the cooking object 200, also significantly improves an ambient humidity of the cooking chamber 11 so as to avoid excessive loss of moisture due to heating in the cooking chamber 11. Also, during the cooking object being cooking at the appropriate cooking temperature T2, the heat produced in the cooking chamber 11 would mainly evaporate moisture in the cooking chamber 11, i.e. the water mist sprayed from the humidification unit 50 instead of the moisture of the cooking object, and thus the evaporation of the water content of the cooking object is greatly reduced, thereby avoiding excessive loss of moisture of the cooking object that generally causes the cooking object to taste dry and hard. Therefore, it facilitates the cooking process in the cooking chamber 11 effectively and ensures the desired taste of the cooking object.

It is worth mentioning that the water mist spraying can be set to execute in an interval manner for predetermined time intervals, for example spraying a predetermined amount of water for a predetermined period of time each time, so as to control the amount of water mist sprayed to moisturize the surface portion of the cooking object 200, wherein for small moisturization, 1.8 ml/mist spraying to 2.2 ml/mist spraying, or for large moisturization, 2.4 ml/mist spraying to 2.7 ml/mist spraying.

It is worth mentioning that a humidification mode of the water mist generating device 51 may be set according to the type of cooking object 200 and/or the desired taste of cooking object 200 to the user. As when the cooking object is a vegetable, the water mist generating device 51 is preferred to continuously increase the ambient humidity of the cooking chamber 11 and to spray the water mist on the one or more surfaces of the cooking object 200, such that the continuous supplement of the ambient humidity in the cooking chamber 11 substantially reduces the moisture loss of the cooking object so as to ensure that the cooking object has a tender taste and the surface portion of the cooking object 200 is also provided with a continuous supplement of water moisture to avoid excessive heating and over loss of moisture of the surface portion of the cooking object 200.

When the cooking object is French fries, the humidification unit 50 to the cooking chamber 11 is preferred to increase the ambient humidity in the cooking chamber 11 intermittently, such that the intermittent replenishment of the ambient humidity of the cooking chamber 11 substantially avoids, excessive loss of moisture of the cooking object, resulting that the cooking object can form a crispy taste to meet the user's taste requirements.

It is appreciated that the preferred embodiment illustrates a general size cooking chamber 11 of the air fryer 100 which humidification unit 50 comprises one water mist generating device 51 mounted on one corner mounting surface 134. However, as shown in FIG. 26, more than one water mist generating devices 51 can be configured alternatively for larger air fryer (cooking apparatus) 100 with larger cooking chamber 11. For example, two water mist generating devices 51, 51' are configured at two opposing corner mounting surfaces 134, 134' according to the present invention.

The control unit 40 is installed in the upper portion 102 of the body 10. According to the preferred embodiment, the control unit 40 can be a control panel installed in front of the upper portion 102 of the body 10 and is configured to comprises a control screen 41 positioned above the cooking drawer 80 to display the cooking information of the cooking apparatus (air fryer) 100.

According to the preferred embodiment, the control unit 40 is configured to control the ambient temperature of the cooking chamber 11 such that, when the ambient temperature of the cooking chamber 11 (that is the temperature set by the user) is defined as temperature T1 at a predetermined distance (for example 10 mm) above a center of the cooking surface 112 of the cooking grill 70 where the cooking object 100 disposed thereon, a temperature detected by the object temperature sensing unit 32 is T2, the temperature T2 of different temperature segments is converted to the temperature T1 by an algorithm of a certain mapping relationship, that is T1=f(T2). For example, 100° C.≤T1≤110° C., T1=T2−B (B is a fixed value), when the user adjusts the set temperature (or the set temperature of the cooking chamber 11 is programmed to be adjusted), the adjusted set temperature T1 is converted to adjust the temperature T2 detected by the temperature sensing unit 30 by adjusting a switching on or off of the heating element 21 of the heating unit 20, for example.

In addition, the control unit 40 is arranged to control the heating unit 20 to stop further increasing the ambient temperature of the cooking chamber 11 when the ambient temperature of the cooking chamber 11 reaches a predetermined set temperature, such that the cooking object 200 can be heated in the cooking chamber 11 at the set temperature to avoid the cooking object 200 from losing of moisture due to the repeatedly heating that adversely affects the taste of the cooked object. Thus, the cooking effect of the cooked object 200 is ensured while meeting the taste requirements of the user.

According to the preferred embodiment, the control unit 40 is also arranged to control the heating unit 20 to maintain the ambient temperature of the cooking chamber 11 at an appropriate cooking temperature when the inner temperature of the cooking object 200 reaches the appropriate cooking temperature so as to assure the surface temperature and the inner temperature of the cooking object 200 to be cooked in such state in the cooking chamber 11 are consistent, thereby avoiding a difference of the surface temperature and the inner temperature of the cooking object 200 while cooking in the cooking chamber 11 that often adversely affects the taste of the cooked object 200 and other defects due to the inconsistency of every cooked portions of the cooking object 200, so as to ensure the preferred cooking effect and taste of the cooked object 200.

According to the preferred embodiment, the air fryer 100 is configured to have an initial heating state, a constant temperature heating state and a to-be-cooked heating state, wherein the air fryer 100 is arranged to be in the initial heating state after the air fryer 100 is activated to function and sequentially, when the ambient temperature of the cooking chamber 11 reaches the predetermined set temperature detected by the ambient temperature sensing unit 30, the air fryer 100 is arranged to be in the constant heating state, and that when the inner temperature of the cooking object 200 reaches the appropriate cooking temperature, which is lower than the predetermined set temperature, detected by the object temperature sensing unit 32, the air fryer 100 is arranged to be in the to-be-cooked heating state.

In addition, during the initial heating state, the control unit 40 is configured to control the heating unit 20 to rapidly heat to increase the ambient temperature of the cooking chamber 11 to reach the predetermined set temperature. During the constant temperature heating state, the control unit 40 is configured to control the heating unit 20 to maintain the ambient temperature of the cooking chamber at the predetermined set temperature. During the to-be-cooked heating state, the control unit 40 is configured to control the heating unit 20 to maintain the ambient temperature of the cooking chamber 11 at the appropriate cooking temperature.

Taking advantage of the cooking apparatus (air fryer) 100 as described above, the present invention provides a method of controlling the ambient humidity of the cooking chamber 11 of the air fryer 100 for cooking one or more of the cooking objects in the cooking chamber 11, which comprises steps of:

(i) detecting an inner temperature of an inner portion of the cooking object 200 after the ambient temperature of the cooking chamber 11 of the air fryer 100 is detected and maintained at the predetermined set temperature by controlling the heating unit 20 in response to a condition that the ambient temperature of the cooking chamber 11 reaches the predetermined set temperature, wherein the heating element 21 of the heating unit 20 generates thermal energy, which is transmitted to the air flow in the cooking chamber 11, and is controlled by a control unit 40 to maintain the ambient temperature of the cooking chamber 11 at the predetermined set temperature;

(ii) maintaining the cooking chamber 11 at the appropriate cooking temperature, greater than or equal to 40° C. and less than or equal to 80° C., by controlling the heating unit 20 to heat the air flow of the cooking chamber 11 when the inner temperature of the cooking object 200 reaches the appropriate cooking temperature, and spraying the water mist from the mist nozzle 512 of the water mist generating device 51 on one or more surfaces of the cooking object 200 in the cooking chamber 11 containing the cooking object 200 such that the air flow heated by the heating unit 20 mainly evaporate the moisture in the cooking chamber 11 instead of the surface moisture of the surface portion of the cooking object 200 to reduce the loss of the surface moisture in the surface portion of the cooking object 200 while the cooking object 200 being cooking at the appropriate cooking temperature such that a surface temperature and the inner temperature of the cooking object 200 are maintained at the appropriate cooking temperature for a predetermined set period of time to gradually cook the cooking object until the cooking object is cooked; and (iii) increasing a speed of the air flow to be heated by the heating unit 20 to contact with the one or more surfaces of the cooking object 200 in the cooking chamber 11 without spraying the water mist to increase the surface temperature of the cooking object 200 until Maillard browning occurs on the one or more surfaces of the cooking object 200.

In the step (ii), the ambient humidity of the cooking chamber 11 containing the cooking object 200 is increased by the water mist generating device 51 which is controlled by the control unit 40 of the air fryer 100, wherein the water mist generating device 51 continuously spraying the water mist in the cooking chamber 11 containing the cooking object 200 to increase the ambient humidity of the cooking chamber 11 to provide a continuous supplement of the ambient humidity in the cooking chamber 11.

According to the preferred embodiment, the method further comprises a step of circulating the air flow in the cooking chamber 11 by the air flow unit 60 which is configured and operated to drive the air flow in the cooking chamber 11, such that the thermal energy generated by the heating unit 20 is transmitted in the cooking chamber 11 to heat the air flow in the cooking chamber 11.

During the step (i) and the step (ii), the air flow unit 60 is controlled in low-speed to drive the air flow in the cooking chamber 11, wherein, during the step (iii), the air flow unit 60 is controlled in high speed to drive the air flow in the cooking chamber 11 to rapidly increase the ambient temperature of the cooking chamber 11. The high speed air circulation of air in the cooking chamber will rapidly increase the surface temperature of the cooking object 200 while the inner portion of the cooking object 200 will not heat up due to the time required for heat transfer, such that the doneness of the cooking object 200 is controlled while having an effect of reducing the moisture loss of the inner portion of the cooking object 200.

Further, in the step (i), the inner temperature of the inner portion of the cooking object 200 is detected by the object temperature sensing unit 32 through inserting the thermistor 322 provided at a front end of a probe body 321ƒ the object temperature sensing unit 32 into the inner portion of the cooking object 200, and the ambient temperature of the cooking chamber 11 is detected by the ambient temperature sensing module 31 installed in the body 10 of the air fryer 100, wherein the object temperature sensing module 30 and the ambient temperature sensing module 31 are electrically connected with the control unit 40.

It is appreciated that the spraying of the water mist on one or more surfaces of the cooking object in the cooking chamber can achieve the following advantages. Portion of the water mist sprayed in the cooking chamber 11, from the mist nozzle 512 to the surfaces of the cooking object 200, will be evaporated to form water vapor to increase a humidity of the cooking chamber. The portion of the water mist sprayed on one or more surface of the cooking object 200 substantially prevents the surface temperature of the cooking object 200 being too high, such as higher than the appropriate cooking temperature; replenishes water to the one or more surfaces of the cooking object to avoid the surfaces of the cooking object from being burnt dry; and reduces the evaporation of moisture content on the surface portion of the cooking object 200.

According to the preferred embodiment, the inner temperature of the inner portion of the cooking object 200 is obtained through a detection of a resistance value of the thermistor value of the thermistor 321 of the object temperature sensing unit 32. In addition, the ambient temperature of the cooking chamber 11 is maintained at the predetermined set temperature by controlling a power supply of the heating unit 20, such that when the ambient temperature of the cooking chamber 11 rises and reaches the predetermined set temperature, a power supply loop of the heating unit 20 is switched off to stop a running and operation of the heating unit 20, and when the ambient temperature of the cooking chamber 11 drops to lower than the predetermined set temperature, the power supply loop of the heating unit 20 is switched on to supply the thermal energy to the cooking chamber 11 and the ambient temperature of the cooking chamber 11 rises back to the predetermined set temperature, so that the ambient temperature of the cooking chamber 11 is maintained at the predetermined set temperature by mean of a cycling of switching on and off of the power supply loop of the heating unit 20.

In order to illustrate the control of the heating unit 20, the ambient temperature sensing module 31 and the object temperature sensing unit 32 of the temperature sensing unit 30, the water mist generating device 51 (humidification unit 50), and the air flow unit 60, cooking examples are described as follows.

(A) Steak Cooking Parameters and Water Loss Rate:

| Ribeye Steak | First Period | Second Period | Third Period | Fourth Period | Fifth Period |
|---|---|---|---|---|---|
| Cooking Chamber Temperature | 100~120° C. | 30~50° C. | x | 180~230° C. | 200~230° C. |
| Moisturization | large | large | x | x | x |
| Air Flow Speed | small | small | large | small | large |
| Cooking Object Temperature Determination of the Object Temperature Sensing Unit | 40~55° C. | x | x | x | x |
| Cooking Time | | 10-15 minutes | 15-18 minutes | 2-5 minutes | 1-3 minutes |

To cook steak (cooking object 200) with the air fryer 100 of the present invention, since the water mist is sprayed on the one or more surfaces of the steak 200 for moisturization of the surface portion of the steak 200, excessive heating of the surfaces of the steak 200 and over loss of surface moisture in the surface portion of the steak 200 is avoid, as shown in FIG. 27A and FIG. 27B.

To compare the similar specification of the same type of steak cooked by the air fryer of the present invention and a conventional oven is recorded as follows for reference:

| | Specification | Initial Temperature | Weight before Cooking | Weight after Cooking | Loss of Moisture | Cooking Apparatus |
|---|---|---|---|---|---|---|
| Rideye Steak | 3.5 cm | 5° C. | 419 g | 365 g | 12% | air fryer of the present invention |
| Rideye Steak | 3.5 cm | 6° C. | 398 g | 333 g | 18% | oven |

(B) Salmon Cooking Parameters and Water Loss Rate:

| Salmon Fillet | First Period | Second Period |
|---|---|---|
| Cooking Chamber Temperature | 50~70° C. | 180~230° C. |
| Moisturization | small | x |
| Air Flow Speed | small | large |
| Cooking Object Temperature Determination of the Object Temperature Sensing Unit | 30~35° C. | 40~55° C. |
| Cooking Time | x | x |

To compare the similar specification of the same type of salmon fillet cooked by the air fryer of the present invention and a conventional oven is recorded as follows for reference:

| | Specification | Initial Temperature | Weight before Cooking | Weight after Cooking | Loss of Moisture | Cooking Apparatus |
|---|---|---|---|---|---|---|
| Salmon Fillet | 3.5 cm | 10° C. | 315 g | 284 g | 9% | air fryer of the present invention |
| Salmon Fillet | 3.5 cm | 10° C. | 298 g | 247 g | 17% | oven |

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An air fryer, comprising:
   a body having a cooking chamber therein for accommodating at least a cooking object on a cooking surface of the cooking chamber;
   a temperature sensing unit which comprises an ambient temperature sensing module for detecting an ambient temperature of the cooking chamber and an object temperature sensing unit for detecting an inner temperature of the cooking object;
   a heating unit configured to generate heat for heating the cooking object in the cooking chamber;

an air flow unit configured to drive an air flow in the cooking chamber;

a water mist generating device, which is arranged above the cooking chamber, comprising a water container arranged in the body for containing a predetermined amount of a water, and at least one mist nozzle communicating with the water container for converting the water from the water container to a water mist and being inclinedly positioned at a ceiling portion of the cooking chamber with an installation angle in such a manner that the water mist is sprayed at a predetermined speed and a spraying angle to ensure the water mist to be sprayed on one or more surfaces of the cooking object disposed in the cooking chamber, wherein the water mist is ejected from the mist nozzle in conical shape, such that when the spraying angle of the mist nozzle is B, the installation angle of the mist nozzle is a with respect to a horizontal line and a distance between the cooking surface and the mist nozzle is D, by adjusting a relationship between the spraying angle β, the installation angle α and the distance D, an area on a plane of the water mist is able to be ensured to be evenly sprayed to the cooking surface to be more than 80%; and a control unit communicating and controlling the temperature sensing unit, the heating unit, the air flow unit, and the water mist generating device, wherein the control unit controls the heating unit to heat the cooking chamber according to the ambient temperature of the cooking chamber and the inner temperature of the cooking object, controls the air flow unit to drive the air flow in the cooking chamber, and controls the water mist generating device to spray the water mist on the one or more surfaces of the cooking object, wherein the control unit further comprises a mist spraying time controller that is configured to control a spraying of a predetermined amount of water for a predetermined period of time for each spraying, so as to control an amount of water mist sprayed to moisturize the one or more surfaces of the cooking object, wherein the control unit controls the air flow unit to drive the air flow in a low speed in the cooking chamber during an initial heating state, a constant temperature heating state and a to-be-cooked heating state, so as to ensure that a water content and moisture of the cooking object would not be excessively lost while enhancing the ambient temperature rising efficiency of the cooking chamber and a heat uniformity in the cooking chamber with respect to the cooking object being cooked therein, wherein the control unit controls the air flow unit to drive the air flow at a high speed in the cooking chamber during a coloring heating state, so as to promptly increase the ambient temperature of the cooking chamber to rapidly increase a surface temperature of the cooking object to rapidly heat the one or more surfaces of the cooking object for facilitating Maillard browning and coloring the one or more surfaces of the cooking object by promptly reducing only a surface moisture of the cooking object by a high speed air circulation of air in the cooking chamber for cooking and coloring while reducing a moisture loss of an inner portion of the cooking object, wherein the control unit is configured to control the ambient temperature of the cooking chamber such that, when the ambient temperature of the cooking chamber is defined as temperature T1 at a predetermined distance above a center of the cooking surface, a temperature detected by the object temperature sensing unit is T2, the temperature T2 of different temperature segments is converted to the temperature T1 by a mapping relationship, T1=f(T2).

2. The air fryer, as recited in claim 1, wherein the heating unit includes at least one heating element supported above the cooking chamber, wherein the air flow unit comprises an air blower arranged above the heating element for driving the air flow in the cooking chamber so as to spread and disseminate heat generated by the heating element in the cooking chamber.

3. The air fryer, as recited in claim 1, further comprising a heat dissipating device arranged between the heating unit and the control unit so as to dissipate heat, generated from the heating unit, around the control unit.

4. The air fryer, as recited in claim 2, further comprising a heat dissipating device arranged between the heating unit and the control unit so as to dissipate heat, generated from the heating unit, around the control unit.

5. The air fryer, as recited in claim 1, wherein a mounting surface is slantly formed at a corner portion of the ceiling portion and has an installation angle and the water mist generating device is mounted on the mounting surface in such a manner that the mist nozzle is arranged inclinedly downwards to eject and spray the water mist from the mist nozzle.

6. The air fryer, as recited in claim 1, wherein the water mist generating device further comprise an angular adjusting member configured to adjust the relationship between the spraying angle β, the installation angle α and the distance D.

* * * * *